US010900803B2

(12) United States Patent
Aoyama et al.

(10) Patent No.: US 10,900,803 B2
(45) Date of Patent: Jan. 26, 2021

(54) COMMUNICATION TERMINAL, SERVER DEVICE, MOVEMENT GUIDANCE SYSTEM, AND COMPUTER PROGRAM

(71) Applicants: AISIN AW CO., LTD., Anjo (JP); TOYOTA JIDOSHA KABUSHIKI KAISHA, Toyota (JP)

(72) Inventors: Shingo Aoyama, Anjo (JP); Daisuke Tanizaki, Okazaki (JP); Koji Ogawa, Anjo (JP); Motohiro Nakamura, Okazaki (JP); Kazunori Watanabe, Okazaki (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 156 days.

(21) Appl. No.: 16/080,509

(22) PCT Filed: Mar. 23, 2017

(86) PCT No.: PCT/JP2017/011780
§ 371 (c)(1),
(2) Date: Aug. 28, 2018

(87) PCT Pub. No.: WO2017/170142
PCT Pub. Date: Oct. 5, 2017

(65) Prior Publication Data
US 2019/0063946 A1 Feb. 28, 2019

(30) Foreign Application Priority Data

Mar. 28, 2016 (JP) ................................ 2016-064276

(51) Int. Cl.
G01C 21/36 (2006.01)
G01C 21/32 (2006.01)
(Continued)

(52) U.S. Cl.
CPC ......... *G01C 21/3694* (2013.01); *G01C 21/32* (2013.01); *G01C 21/367* (2013.01);
(Continued)

(58) Field of Classification Search
CPC .. G01C 21/3694; G01C 21/32; G01C 21/367; H04W 4/024; G06F 16/29; G08G 1/096811; G09B 29/00
See application file for complete search history.

(56) References Cited

U.S. PATENT DOCUMENTS 6,075,467 A 6/2000 Ninagawa
6,889,134 B2 5/2005 Nakane et al.
(Continued)

FOREIGN PATENT DOCUMENTS

EP 1 464 922 A1 10/2004
EP 1 884 742 A2 2/2008
(Continued)

OTHER PUBLICATIONS

Nov. 21, 2018 Supplementary European Search Report issued in European Patent Application No. 17774680.7.
(Continued)

Primary Examiner — Calvin Cheung
(74) Attorney, Agent, or Firm — Oliff PLC

(57) ABSTRACT

A communication terminal is connected to a server and transmits a route search request for a destination to the server and obtains a route searched for from the server according to the request. When setting a destination or transmitting the route search request to the server, the terminal requests the server for guidance information targeted for at least an update target area around a current location among update target areas. The guidance information is for providing movement guidance for a mobile unit, and the update target areas are areas whose terminal-side
(Continued)

map information included in the terminal is an older version of map information relative to the server's device-side map information. The terminal receives the guidance information transmitted from the server according to the request for the guidance information, and provides the movement guidance for the mobile unit using a route set on the terminal and the received guidance information.

7 Claims, 14 Drawing Sheets

(51) Int. Cl.
    *G09B 29/00*     (2006.01)
    *G08G 1/0968*     (2006.01)
    *H04W 4/024*     (2018.01)
    *G06F 16/29*     (2019.01)

(52) U.S. Cl.
    CPC ....... *G06F 16/29* (2019.01); *G08G 1/096811* (2013.01); *G09B 29/00* (2013.01); *H04W 4/024* (2018.02)

(56) References Cited

U.S. PATENT DOCUMENTS

| | | | |
|---|---|---|---|
| 7,974,959 B2 | 7/2011 | Sawai et al. | |
| 8,649,976 B2 | 2/2014 | Kreft | |
| 9,285,238 B2 | 3/2016 | Nogawa et al. | |
| 2002/0091485 A1 | 7/2002 | Mikuriya et al. | |
| 2003/0045997 A1 | 3/2003 | Nakane et al. | |
| 2004/0204843 A1 | 10/2004 | Hayama et al. | |
| 2004/0267441 A1* | 12/2004 | Kim | G01C 21/3492 701/410 |
| 2006/0080029 A1* | 4/2006 | Kodani | G08G 1/096827 701/420 |
| 2006/0173614 A1 | 8/2006 | Nomura | |
| 2007/0213929 A1 | 9/2007 | Tanizaki et al. | |
| 2007/0244636 A1* | 10/2007 | Horikami | G01C 21/32 701/532 |
| 2011/0106431 A1* | 5/2011 | Tomobe | G01C 21/32 701/533 |
| 2011/0270798 A1 | 11/2011 | Nagasaka et al. | |
| 2011/0282575 A1* | 11/2011 | Masuda | G01C 21/32 701/533 |
| 2012/0130944 A1* | 5/2012 | Masuda | G01C 21/32 707/609 |
| 2013/0013557 A1* | 1/2013 | Kunath | G01C 21/32 707/609 |
| 2013/0117322 A1* | 5/2013 | Fischer | G01C 21/32 707/792 |
| 2013/0311091 A1* | 11/2013 | Davis | G06F 16/29 701/533 |
| 2014/0317560 A1 | 10/2014 | Hashimoto | |
| 2016/0334239 A1* | 11/2016 | Cho | H04L 67/42 |
| 2017/0116487 A1* | 4/2017 | Yamazaki | H04N 13/271 |
| 2018/0164120 A1 | 6/2018 | Aoyama et al. | |

FOREIGN PATENT DOCUMENTS

| | | |
|---|---|---|
| EP | 2 221 582 A2 | 8/2010 |
| EP | 2 280 242 A2 | 2/2011 |
| JP | H11-65436 A | 3/1999 |
| JP | 2003-65770 A | 3/2003 |
| JP | 2003-75174 A | 3/2003 |
| JP | 2003-077095 A | 3/2003 |
| JP | 2003-195743 A | 7/2003 |
| JP | 2008-216268 A | 9/2008 |
| JP | 2011-069665 A | 4/2011 |
| JP | 2011-69666 A | 4/2011 |
| JP | 2011-80774 A | 4/2011 |
| JP | 2016-125952 A | 7/2016 |
| WO | 2013/103002 A1 | 11/2013 |

OTHER PUBLICATIONS

Jun. 13, 2017 International Search Report issued in International Patent Application No. PCT/JP2017/011780.
Jun. 13, 2017 International Search Report issued in International Patent Application No. PCT/JP2017/011783.
Nov. 22, 2019 Office Action issued in U.S. Appl. No. 16/080,533.
Mar. 30, 2020 Notice of Allowance issued in U.S. Appl No. 16/080,533.
Jan. 24, 2020 Office Action issued in U.S. Appl. No. 15/836,194.
Jul. 9, 2020 Office Action issued in U.S. Appl. No. 15/836,194.
Sep. 15, 2020 Office Action issued in U.S. Appl. No. 16/080,533.
U.S. Appl. No. 15/836,194, filed Dec. 8, 2017 in the name of Aoyama et al.
U.S. Appl. No. 16/080,533, filed Aug. 28, 2018 in the name of Shingo Aoyama et al.

* cited by examiner

Table update information

COMMUNICATION TERMINAL, SERVER DEVICE, MOVEMENT GUIDANCE SYSTEM, AND COMPUTER PROGRAM

TECHNICAL FIELD

Related technical fields include communication terminals, server devices, movement guidance systems, and computer programs that provide movement guidance for a mobile unit.

BACKGROUND

In recent years, a navigation device that provides vehicle travel guidance so that a driver can easily reach a desired destination has been often mounted on vehicles. Here, the navigation device is a device that allows to detect a current location of the vehicle by a GPS receiver, etc., obtain map information for the current location through a recording medium such as a DVD-ROM or an HDD or a network, and display the map information on a liquid crystal monitor. In addition, the above-described navigation device has a route search function that searches for, when a desired destination is set, an optimal route from a point of departure (e.g., the current vehicle location) to the set destination, and further has a travel guidance function that provides travel guidance according to the searched route (guided route). In addition, in recent years, there have also been mobile phones, personal digital assistants (PDAs), smartphones, personal computers, etc., that have the same functions as those of the above-described navigation device (hereinafter, referred to as communication terminals including a navigation device).

Here, new roads (newly constructed roads) are constructed all over Japan every year. In addition, along with this, existing roads disappear, intersections are added, or the shapes of existing roads or intersections are changed. At that time, there is a problem that information about newly constructed roads, etc., that are newly constructed after the creation of map information included in a communication terminal is not registered in the map information. Namely, in the communication terminal having map information that does not include newly constructed roads, etc., the newly constructed roads, etc., do not serve as targets for a route search or guidance, and thus, appropriate travel guidance may not be provided, e.g., a roundabout guided route that does not pass through a newly constructed road, etc., is searched for, or roads or intersections that actually exist are not guided on a map image.

Hence, in recent years, there has been proposed a configuration in which a server device having the latest map information performs a route search instead of the communication terminal side, and a guided route is obtained from the server device (hereinafter, referred to as center route search). However, when a center route search is performed, while a route can be searched for based on the latest map information, a problem occurs in which the communication terminal side having an old version of map information cannot appropriately provide travel guidance along a guided route. For example, when a guided intersection at which a left or right turn is to be made in a guided route is a newly constructed intersection, left or right turn guidance at the guided intersection is not provided. In addition, in the case of an intersection whose structure has been changed, guidance in the wrong direction is provided based on old map information.

As means for avoiding the above-described problems when performing a center route search, for example, JP 2003-77095 A proposes a technique in which, when a server device receives a route search request from a navigation device, while the server device searches for a route, the server device transmits the mesh codes of meshes through which the searched route passes and version information, together with the searched route, to the navigation device, and the navigation device determines, based on the mesh codes and version information transmitted from the server device, whether the version of corresponding mesh data (map information) is older than that of mesh data stored in the server device, and requests the server device for the latest version of mesh data targeted for meshes that have been determined to be old.

SUMMARY

Here, in the technique of the above-described JP 2003-77095 A, first, the server device performs a route search and after determining a guided route, it is determined whether the latest version of mesh data needs to be obtained from the server device. Then, if it is determined that the latest version of mesh data needs to be obtained, the navigation device thereafter requests the server device for the mesh data at a later time point. Therefore, it requires a very long time to obtain required mesh data after setting a guided route, and thus, a problem occurs such as guidance based on the guided route cannot be provided during such a period or erroneous guidance is provided.

Exemplary embodiments of the broad inventive principles described herein solve the above-described conventional problems, and provide a communication terminal, a server device, a movement guidance system, and a computer program that obtain, when performing a center route search, guidance information in advance for providing movement guidance for a mobile unit, by which the occurrence of an event that after the communication terminal obtains a guided route from the server device, movement guidance based on the guided route is not provided or erroneous guidance is provided is prevented as much as possible.

Exemplary embodiments provide a communication terminal (and a computer program therefore) that is connected to a server device in a two-way communicable manner and transmits a route search request for a destination to the server device and obtains a route searched for and delivered by the server device according to the route search request. When setting a destination or transmitting the route search request to the server device, the communication terminal requests the server device for guidance information targeted for at least an update target area around a current location among update target areas. The guidance information is for providing movement guidance for a mobile unit, and the update target areas are areas whose terminal-side map information included in the communication terminal is an older version of map information relative to device-side map information included in the server device. The communication terminal receives the guidance information transmitted from the server device according to the request for the guidance information, and provides the movement guidance for the mobile unit using a guided route set on the communication terminal and the received guidance information.

Note that the "mobile unit" includes a pedestrian and a two-wheeled vehicle in addition to a vehicle.

Note also that the "version of map information" includes any of the creation time of the map information, an update time when the last update to the map information is made, and a time when map update information (update program) used when the last update is made is created.

Exemplary embodiments provide a server device (and a computer program therefore) that is connected to a communication terminal in a two-way communicable manner and that receives a route search request for a destination from the communication terminal and delivers a route searched for according to the received route search request to the communication terminal. Specifically, the server receives a request for guidance information for providing movement guidance for a mobile unit from the communication terminal that sets a destination or transmits the route search request to the server device. The server transmits guidance information targeted for at least an update target area around a current location among update target areas to the communication terminal according to a request for the guidance information. The update target areas are areas whose terminal-side map information included in the communication terminal is an older version of map information relative to device-side map information included in the server device.

Exemplary embodiments provide a movement guidance system that includes the server device and the communication terminal.

According to a communication terminal, a server device, a movement guidance system, and a computer program that have the above-described configurations, when performing a center route search, guidance information for providing movement guidance for a mobile unit is obtained in advance, by which the occurrence of an event that after the communication terminal obtains a guided route from the server device, movement guidance based on the guided route is not provided or erroneous guidance is provided is prevented as much as possible. As a result, even if map information included in the communication terminal is an older version of map information compared to map information included in the server device, movement guidance for the mobile unit based on a guided route that is searched for by the server device can be appropriately provided. In addition, since instead of map information (including facility data, data used for a route search, etc., in addition to guidance information for providing movement guidance), guidance information which is a part of the map information is selectively obtained in advance from the server device, the amount of information delivered can be reduced compared to the case of obtaining map information.

DETAILED DESCRIPTION OF EXEMPLARY EMBODIMENTS

A first embodiment and a second embodiment in which a communication terminal, a server device, a movement guidance system, and a computer program are embodied will be described in detail below with reference to the drawings.

First Embodiment

Figure 1:
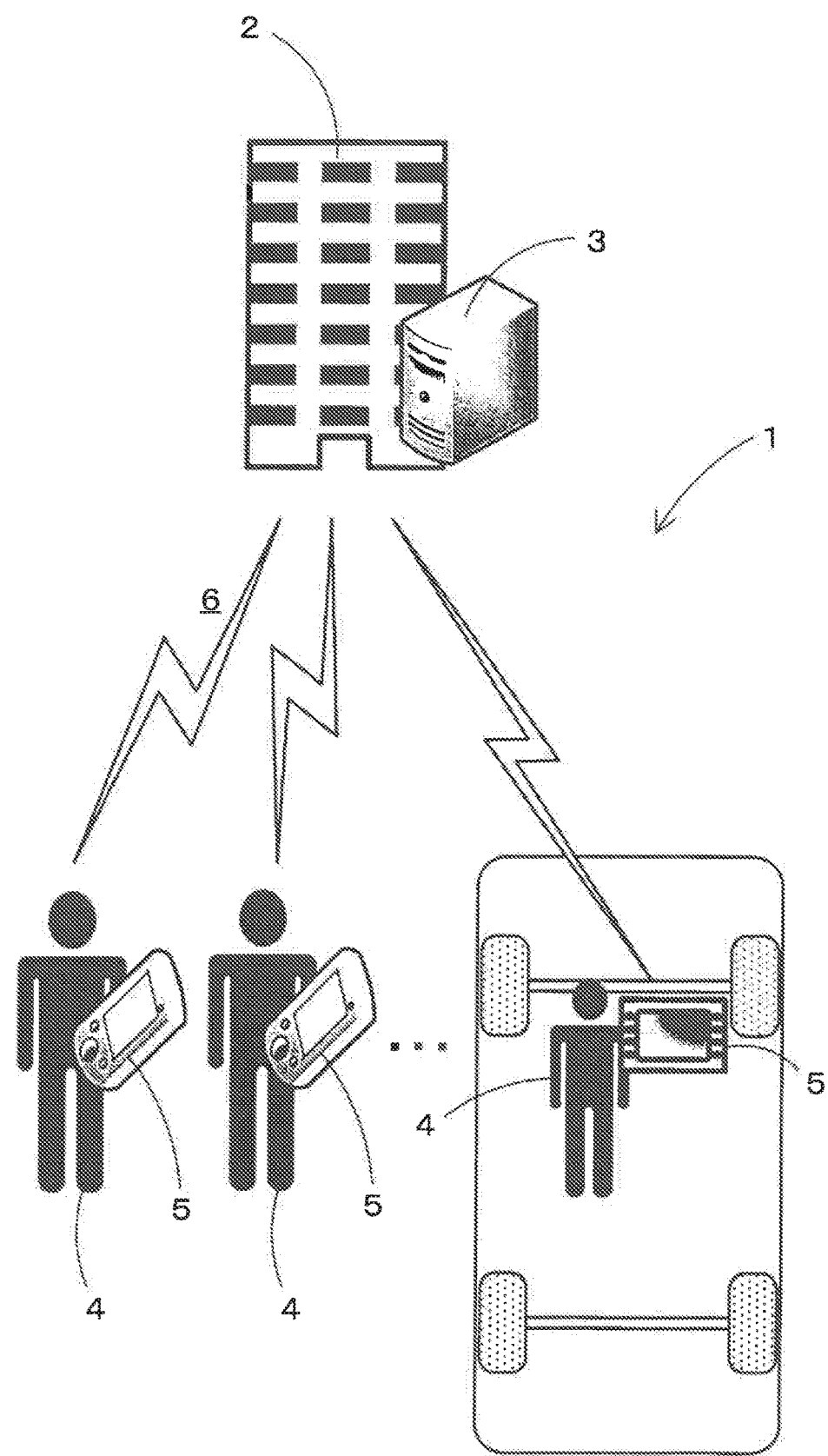
FIG. 1 is a schematic configuration diagram showing a movement guidance system according to a first embodiment.
Figure 2:
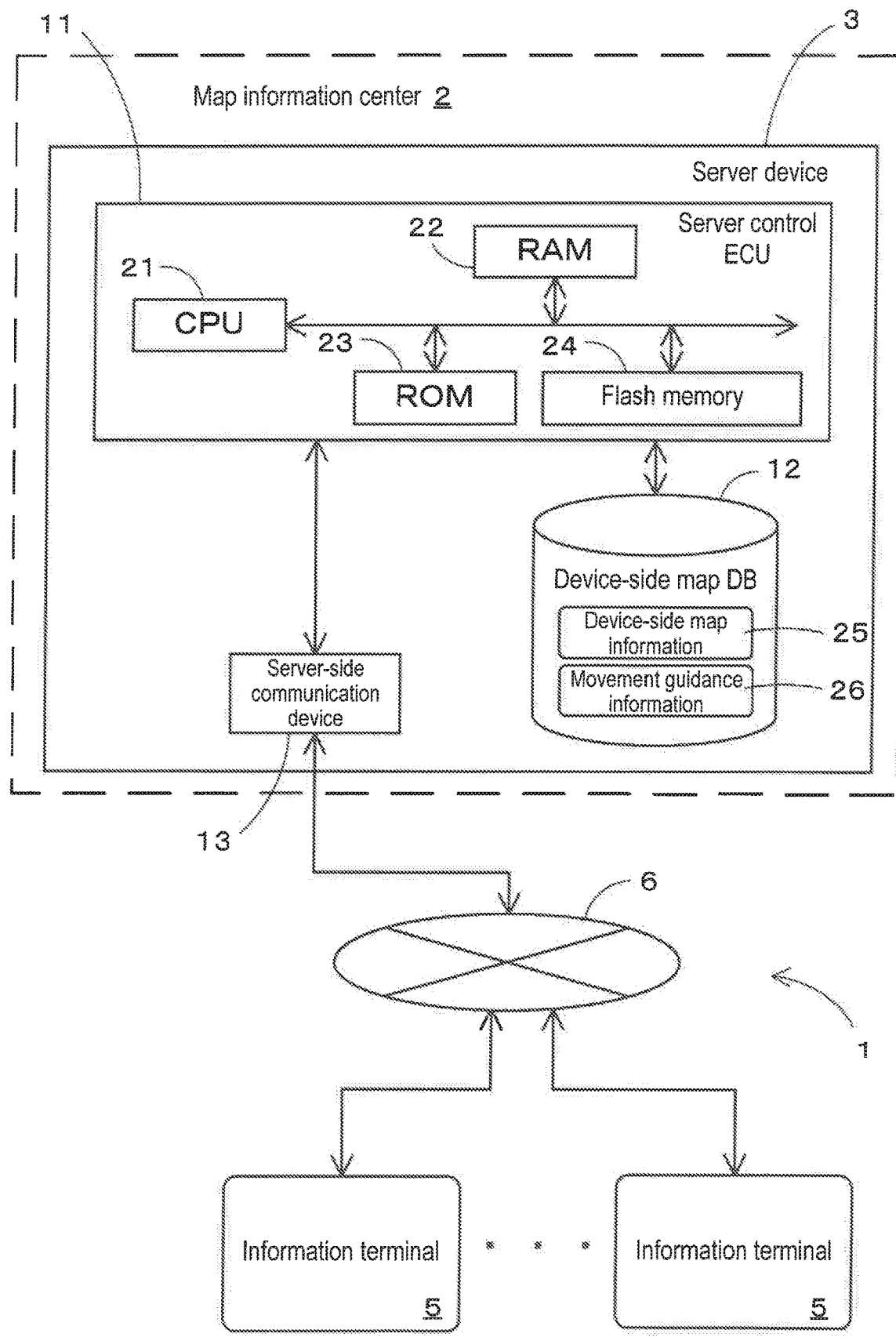
FIG. 2 is a block diagram showing a configuration of the movement guidance system according to the first embodiment.

First, a schematic configuration of a movement guidance system 1 according to the first embodiment will be described using FIGS. 1 and 2. FIG. 1 is a schematic configuration diagram showing the movement guidance system 1 according to the first embodiment. FIG. 2 is a block diagram showing a configuration of the movement guidance system 1 according to the first embodiment.

As shown in FIG. 1, the movement guidance system 1 according to the first embodiment basically includes a server device 3 provided in a map information center 2; and communication terminals 5 carried by users 4. In addition, the server device 3 and the communication terminals 5 are configured to be able to perform transmission and reception of electronic data with each other through a communication network 6. Note that the communication terminals 5 include, for example, mobile phones, smartphones, tablet terminals, personal computers, and navigation devices. In addition, the users 4 may be in a state of getting in a vehicle or may be in a state of not getting in a vehicle.

Here, the server device 3 performs a route search according to a request from a communication terminal 5. Specifically, when a communication terminal 5 has set a destination or performs a re-search for a route (rerouting), the communication terminal 5 transmits information required for a route search such as a point of departure and a destination, together with a route search request, to the server device 3 (note, however, that in the case of a re-search, information about a destination does not necessarily need to be transmitted). Then, the server device 3 having received the route search request performs a route search using map information included in the server device 3, and identifies a recommended route from the point of departure to the destination. Thereafter, the identified recommended route is transmitted to the communication terminal 5 which is the request source. Then, the communication terminal 5 sets the received recommended route as a guided route and provides movement guidance according to the guided route. By this, even if map information included in the communication terminal 5 at the time of a route search is an old version of map information, an appropriate guided route can be set based on the latest version of map information included in the server device 3.

In addition to the delivery of the above-described searched route, the server device 3 also delivers movement guidance information for providing movement guidance for a user on the communication terminal 5, according to a request from the communication terminal 5. Note that the movement guidance information is information created based on the latest version of map information and used to identify a current location, provide simple travel guidance along a guided route, and display an image on the communication terminal 5 according to the latest version of map information as will be described later. Then, by the communication terminal 5 using the movement guidance information delivered from the server device 3, even if map information included in the communication terminal 5 is an old version of map information, the communication terminal 5 can provide movement guidance along a guided route that is searched for by the server device 3 based on the latest version of map information.

Meanwhile, the communication terminal 5 is carried by a user 4, and for the communication terminal 5 an information terminal having navigation functions is used. The communication terminal 5 corresponds, for example, to a mobile phone, a smartphone, a tablet terminal, a personal computer, or a navigation device.

Here, the navigation functions correspond to the functions of searching for a route appropriate to conditions specified by the user, displaying a map image around a current location of the user 4, displaying the current location of the user 4 in the displayed map image, and providing movement guidance along a set guided route. Note that the communication terminal 5 does not need to have all of the above-described navigation functions as long as the communication terminal 5 has at least the function of searching for a route and the function of providing movement guidance along a set guided route.

In addition, the communication network 6 includes a large number of base stations disposed all over the country and telecommunications companies that manage and control the base stations, and is formed by connecting the base stations to the telecommunications companies by wire (optical fiber, ISDN, etc.) or wirelessly. Here, each base station includes a transceiver and an antenna that perform communication with communication terminals 5. While the base station performs wireless communication with a telecommunications company, the base station serves as an end of the communication network 6 and plays a role in relaying communication of communication terminals 5 present in an area (cell) in which radio waves from the base station reach, with the server device 3.

Next, a configuration of the server device 3 in the movement guidance system 1 will be described in more detail using FIG. 2. The server device 3 includes, as shown in FIG. 2, a server control ECU 11; a device-side map DB 12 serving as a storage medium and connected to the server control ECU 11; and a server-side communication device 13. (As used herein, the term "storage medium" is not intended to encompass transitory signals.)

The server control ECU 11 (electronic control unit) is an electronic control unit that performs overall control of the server device 3, and includes a CPU 21 serving as a computing device and a control device; and internal storage media such as a RAM 22 that is used as a working memory when the CPU 21 performs various types of arithmetic processing, a ROM 23 having recorded therein a movement guidance processing program which will be described later (see FIGS. 6 and 7), etc., in addition to a program for control, and a flash memory 24 that stores a program read from the ROM 23. Note that the server control ECU 11 includes various types of means serving as processing algorithms with an ECU of a communication terminal 5 which will be described later. For example, guidance information request receiving means receives a request for movement guidance information for providing movement guidance for a mobile unit (e.g., a user him/herself or a vehicle) from a communication terminal 5. Guidance information transmitting means transmits movement guidance information for target areas to the communication terminal 5 according to the request for movement guidance information.

In addition, the device-side map DB 12 is storage means for storing device-side map information 25 such that the device-side map information 25 is divided into areas (e.g., level-10 meshes of 20 km square), the device-side map information 25 being the latest version of map information which is registered based on input data and input operations from an external source. Here, the version is creation time information for identifying a time when map information is created, a time when the last update is made, or a time when map update information (update program) used when the last update is made is created. By referring to the version, the time when map information is created, etc., can be identified.

Here, the device-side map information 25 basically has the same configuration as map information stored in the communication terminal 5, and includes a road network and various types of information required for a route search, route guidance, and map display. The device-side map information 25 includes, for example, link data about roads (links), node data about node points, intersection data about each intersection, location data about locations such as facilities, map display data for displaying a map, search data for searching for a route, and retrieval data for retrieving a location.

For the search data, various types of data are recorded that are used for a route search process for searching for a route from a point of departure (e.g., a current vehicle location) to a set destination as will be described later. For example, cost calculation data is stored that is used to calculate search costs such as a cost obtained by converting an appropriate level of an intersection for a route into a number (hereinafter, referred to as intersection cost) and a cost obtained by converting an appropriate level of a link forming a road for a route into a number (hereinafter, referred to as link cost).

In addition, the device-side map DB 12 also stores, separately from the device-side map information 25, movement guidance information 26 such that the movement guidance information 26 is divided into areas (e.g., level-13 meshes of 2.5 km square), the movement guidance information 26 being information for identifying a current location and providing simple travel guidance along a guided route on the communication terminals 5 according to the latest version of map information.

Here, the movement guidance information 26 includes matching data required to perform map matching for a current user location; guidance data required for guidance for allowing a user to move along a guided route, such as left or right turn guidance at guided intersections; and display data for displaying a map image and a guidance screen. Note that the matching data includes, for example, data for identifying road shapes. In addition, the guidance data includes, for example, data for identifying the shapes of intersections and a connection relationship between intersections and roads. In addition, the display data includes data for displaying, on a display of the communication terminal 5, a map image including a road network and a guidance screen for providing movement guidance.

Then, when the server control ECU 11 receives a route search request from a communication terminal 5 as will be described later, the server control ECU 11 performs a route search from a point of departure to a destination, using the device-side map information 25. Then, the server control ECU 11 delivers the searched route to the requested communication terminal 5. In addition, the server control ECU 11 also delivers movement guidance information 26 to the communication terminal 5 as necessary. Specifically, the server control ECU 11 is configured to deliver movement guidance information 26 for target areas to the communication terminal 5, the target areas being areas in which the communication terminal 5 is likely to move in the future (e.g., areas around a current location of the communication terminal 5 and/or areas around a guided route set on the communication terminal 5) and being areas whose map information included in the communication terminal 5 is an older version than device-side map information 25, i.e., areas that require movement guidance information 26 for the future movement guidance on the communication terminal 5.

Meanwhile, the server-side communication device 13 is a communication device for performing communication with the communication terminals 5 through the communication network 6. In addition to the communication terminals 5, it is also possible to receive traffic information including various information such as congestion information, regulation information, and traffic accident information which are transmitted from an Internet network or a traffic information center, e.g., a VICS (registered trademark: Vehicle Information and Communication System) center or a probe center.

Figure 3:
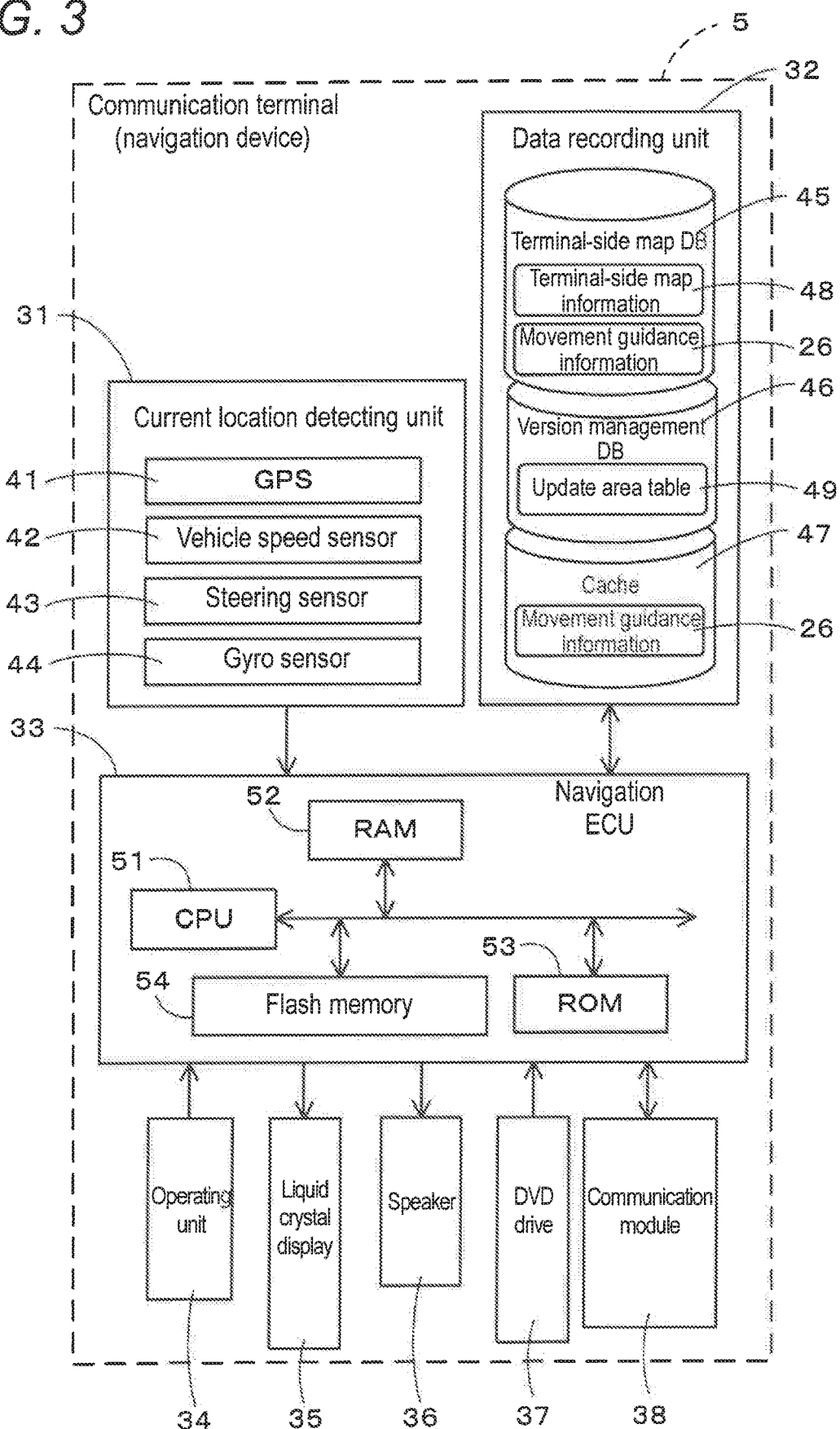
FIG. 3 is a block diagram schematically showing a control system of a communication terminal according to the first embodiment.

Next, a schematic configuration of the communication terminal 5 will be described using FIG. 3. Note that in the following description an example case will be described in which a navigation device installed in a vehicle is used as the communication terminal 5, and travel guidance for particularly a vehicle as a mobile unit is provided. Note, however, that instead of a navigation device, a mobile phone, a tablet terminal, a personal computer, etc., may be used. In addition, when a mobile phone or a tablet terminal is used, it is also possible to provide movement guidance for a mobile unit other than a vehicle (e.g., a pedestrian or a bicycle). FIG. 3 is a block diagram schematically showing a control system of a navigation device which is the communication terminal 5 according to the first embodiment.

As shown in FIG. 3, the communication terminal 5 according to the first embodiment includes a current location detecting unit 31 that detects a current location of a vehicle (mobile unit) having mounted thereon a navigation device which is the communication terminal 5; a data recording unit 32 having various types of data recorded therein; a navigation ECU 33 that performs various types of arithmetic processing based on inputted information; an operating unit 34 that accepts operations from a user; a liquid crystal display 35 that displays a map and a guided route to a destination for the user; a speaker 36 that outputs audio guidance regarding route guidance; a DVD drive 37 that reads a DVD which is a storage medium; and a communication module 38 that performs communication with the server device 3, a VICS center, etc.

The components forming the communication terminal 5 will be described in turn below.

The current location detecting unit 31 includes a GPS 41, a vehicle speed sensor 42, a steering sensor 43, a gyro sensor 44, etc., and can detect a current vehicle location, orientation, vehicle travel speed, current time, etc. Here, particularly, the vehicle speed sensor 42 is a sensor for detecting the movement distance and vehicle speed of the vehicle, and generates pulses according to the rotation of drive wheels of the vehicle and outputs a pulse signal to the navigation ECU 33. Then, the navigation ECU 33 calculates the rotational speed and movement distance of the drive wheels by counting the generated pulses. Note that the communication terminal 5 does not need to include all of the above-described four types of sensors, and the communication terminal 5 may be configured to include only one or a plurality of types of sensors among those sensors.

In addition, the data recording unit 32 includes a hard disk (not shown) serving as an external storage device and a recording medium; and a recording head (not shown) that is a driver for reading a terminal-side map DB 45, a version management DB 46, a cache 47, a predetermined program, and the like, which are recorded on the hard disk, and writing predetermined data to the hard disk. Note that the data recording unit 32 may be composed of a nonvolatile memory, a memory card, or an optical disc such as a CD or a DVD, instead of a hard disk.

Here, the terminal-side map DB 45 is storage means for storing terminal-side map information 48 used for a route search or travel guidance on the communication terminal 5.

Here, the terminal-side map information 48 stored in the terminal-side map DB 45 includes, as with the above-described device-side map information 25, a road network and various types of information required for a route search, route guidance, and map display. The terminal-side map information 48 includes, for example, link data about roads (links), node data about node points, intersection data about each intersection, location data about locations such as facilities, map display data for displaying a map, search data for searching for a route, and retrieval data for retrieving a location.

In addition, the terminal-side map information 48 stored in the terminal-side map DB 45 is updated to a new version of map information on a section-by-section basis (e.g., on a mesh-by-mesh basis) by writing new data over data for a corresponding portion based on map update information delivered from a map delivery server which is not shown or map update information obtained from a recording medium. In addition, it is also possible to make an update to the entire map information instead of on a section-by-section basis. In addition, the terminal-side map DB 45 also stores movement guidance information 26 for identifying a current location, providing travel guidance along a guided route, and displaying an image on the communication terminals 5 according to map information, such that the movement guidance information 26 is divided into areas (e.g., level-13 meshes of 2.5 km square).

In addition, the version management DB 46 is storage means for recording information that identifies the version of terminal-side map information 48 currently stored in the terminal-side map DB 45 (e.g., a version number, the last updated date, or the creation date of map update information (update program) having made the last update), on a section-by-section basis (e.g., on a mesh-by-mesh basis) of map information. Note that with an update of terminal-side map information 48 to a new version of map information, corresponding content of the version management DB 46 is updated.

Figure 4:
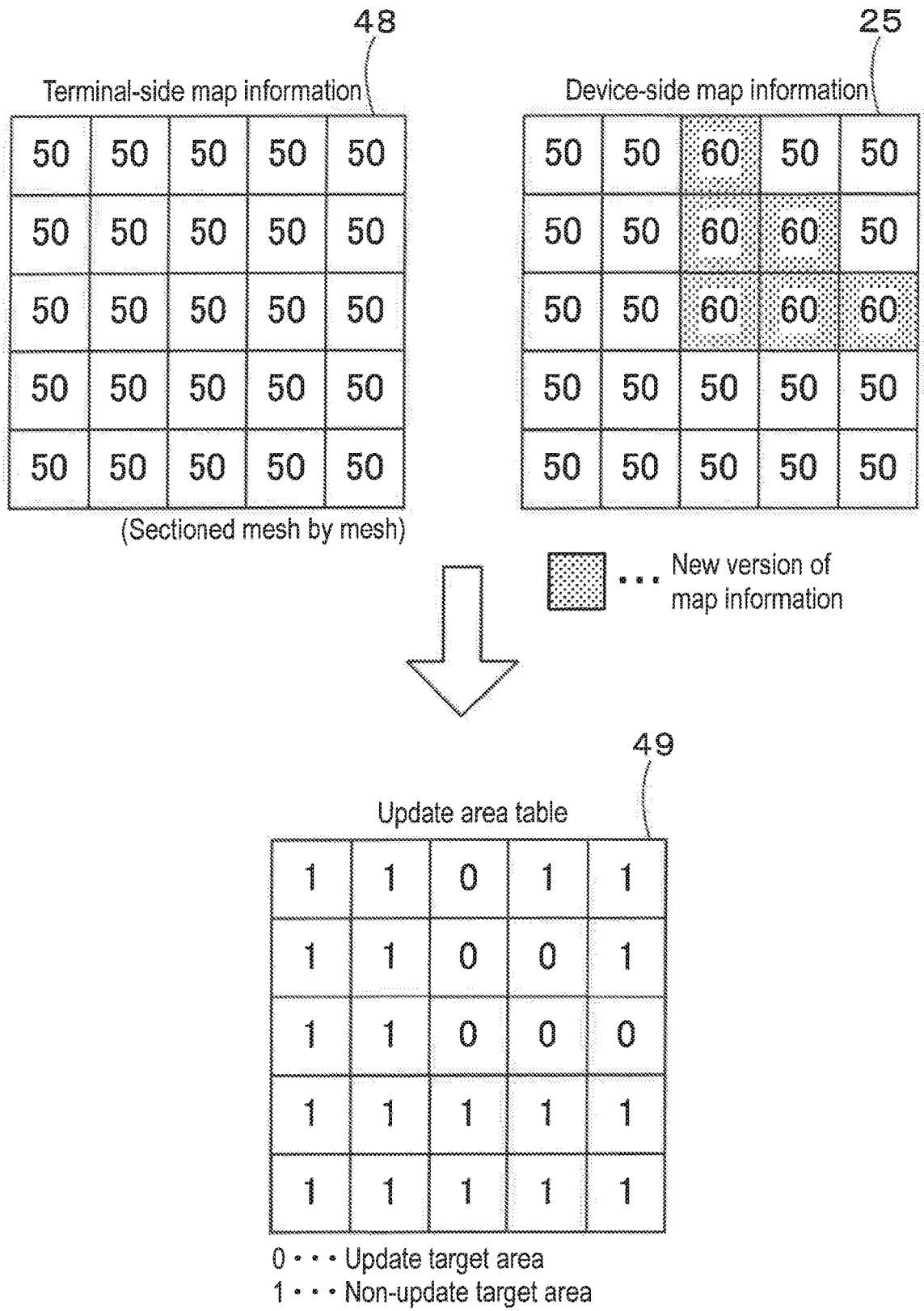
FIG. 4 is a diagram showing an example of an update area table.

In addition, the version management DB 46 stores an update area table (area identification information) 49 as information that identifies an area (hereinafter, referred to as update target area) whose terminal-side map information 48 included in the communication terminal 5 is an older version of map information relative to device-side map information 25 included in the server device 3. Here, the update area table 49 is a table in which flags that identify a section corresponding to an update target area and a section not corresponding to an update target area are assigned on a section-by-section basis (e.g., on a mesh-by-mesh basis) of map information. FIG. 4 shows an example of the update area table 49.

FIG. 4 shows a state in which a road is newly constructed and of the meshes forming the device-side map information 25 included in the server device 3, a total of six meshes which are corresponding areas are updated from the previous version "50" to the new version "60." In this situation, the terminal-side map information 48 included in the communication terminal 5 is before update at the present time, and terminal-side map information 48 for the meshes having been updated to the version "60" in the device-side map information 25 still have the version "50." Namely, there are update target areas whose terminal-side map information 48 included in the communication terminal 5 is an older version of map information relative to the device-side map information 25 included in the server device 3. As shown in FIG. 4, in the update area table 49, flags that identify a section corresponding to an update target area and a section not corresponding to an update target area are assigned on a mesh-by-mesh basis. Specifically, "0" is assigned to a mesh corresponding to an update target area, and "1" is assigned to a mesh not corresponding to an update target area. Note that although the example shown in FIG. 4 shows the update area table 49 targeted for 5×5 meshes for simplification of description, the actual update area table 49 is a table in which flags are assigned to each mesh forming all areas of the country (when a mesh has a plurality of levels, flags are assigned on an area-by-area basis and on a level-by-level basis).

As a result, by referring to the update area table 49, the navigation ECU 33 can easily identify update target areas (i.e., areas whose terminal-side map information 48 included in the communication terminal 5 is an older version of map information relative to device-side map information 25 included in the server device 3). Note that the update area table 49 is updated as appropriate based on update information which is transmitted from the server device 3, as will be described later. For example, when device-side map information 25 or terminal-side map information 48 is updated to a new version of map information, the update area table 49 is also updated accordingly. Note that for a criterion for area sections for the update area table 49, a common criterion for the server device 3 and the communication terminal 5 is used.

Meanwhile, the cache 47 is storage means for temporarily saving movement guidance information 26 which is delivered from the server device 3. In the movement guidance system 1 according to the first embodiment, as described previously, movement guidance information 26 for target areas is delivered from the server device 3 and stored in the cache 47, the target areas being areas in which the vehicle is likely to travel in the future (e.g., areas around a current vehicle location and/or areas around a guided route set on the communication terminal 5) and being areas whose terminal-side map information 48 included in the communication terminal 5 is an older version than device-side map information 25, i.e., areas that require movement guidance information 26 for the future vehicle movement guidance. Here, the movement guidance information 26 is, as described previously, information for identifying a current location, providing simple travel guidance along a guided route, and displaying an image on the communication terminal 5 according to the latest map information.

Then, for the areas whose terminal-side map information 48 included in the communication terminal 5 is an older version than device-side map information 25, the navigation ECU 33 performs identification of a current vehicle location, travel guidance along a guided route, display of an image, etc., using a new version of movement guidance information 26 stored in the cache 47, instead of an old version of map information or movement guidance information stored in the terminal-side map DB 45.

Figure 5:
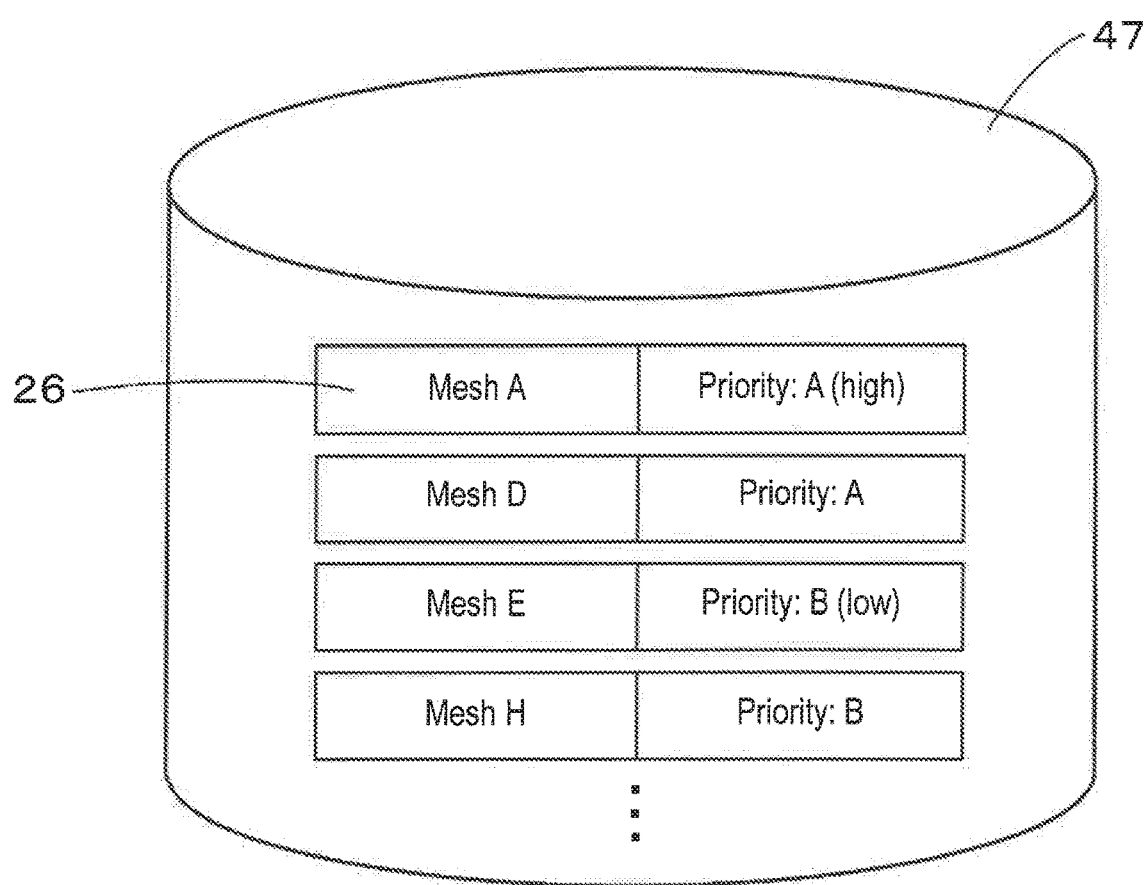
FIG. 5 is a diagram showing an example of movement guidance information stored in a cache.

In addition, the movement guidance information 26 stored in the cache 47 is set with remaining priorities on a section-by-section basis (e.g., on a mesh-by-mesh basis) of map information. When the cache 47 is lack of its storage area, of the pieces of movement guidance information 26 stored in the cache 47, pieces of movement guidance information 26 for area sections with a low remaining priority are deleted on a priority basis. Note that movement guidance information 26 for area sections that require movement guidance information for the future vehicle movement guidance as will be described later, more specifically, area sections located around a current vehicle location and/or area sections located around a guided route set on the communication terminal 5, is set with a higher remaining priority than movement guidance information 26 for other area sections. FIG. 5 is a diagram showing an example of the movement guidance information 26 stored in the cache 47.

As shown in FIG. 5, in the cache 47, movement guidance information 26 is stored so as to be divided on a mesh-by-mesh basis which is a section-by-section basis of map information, and is set with remaining priorities. Note that in the first embodiment the remaining priority is set to either "A (high)" or "B (low)." Therefore, in the example shown in FIG. 5, since movement guidance information 26 for a mesh E and a mesh H has a lower remaining priority than movement guidance information 26 for a mesh A and a mesh B, the mesh E and the mesh H are deleted from the cache 47 on a priority basis. Note that in the first embodiment the remaining priority is set to two levels but may be set to more detailed levels. Note also that the remaining priorities may be stored so as to be associated with meshes (area sections) instead of movement guidance information 26.

Meanwhile, the navigation ECU (electronic control unit) 33 is an electronic control unit that performs overall control of the communication terminal 5, and includes a CPU 51 serving as a computing device and a control device; and internal storage devices such as a RAM 52 that is used as a working memory when the CPU 51 performs various types of arithmetic processing and that stores route data obtained when a route is searched for, etc., a ROM 53 having recorded therein a movement guidance processing program which will be described later (see FIGS. 6 and 7), etc., in addition to a program for control, and a flash memory 54 that stores a program read from the ROM 53. Note that the navigation ECU 33 includes various types of means serving as processing algorithms with the ECU of the server device 3. For example, area identifying means identifies update target areas which are areas whose device-side map information 25 included in the communication terminal 5 is an older version of map information relative to terminal-side map information 48 included in the server device 3. Guidance information requesting means, when setting a destination or transmits a route search request to the server device 3, requests the server device 3 for movement guidance information targeted for at least update target areas around a current location, the movement guidance information being for providing vehicle travel guidance. Guidance information receiving means receives movement guidance information 26 transmitted from the server device 3 according to the request for the movement guidance information 26.

Guiding means provides vehicle travel guidance using a guided route set on the communication terminal 5 and the movement guidance information 26 received by the guidance information receiving means.

The operating unit 34 is operated when, for example, a point of departure which is a travel start point and a destination which is a travel end point are inputted, and includes a plurality of operating switches such as various types of keys and buttons (not shown). Then, based on switch signals outputted by, for example, depression of various switches, the navigation ECU 33 performs control to perform corresponding various types of operation. Note that the operating unit 34 may include a touch panel provided on the front of the liquid crystal display 35. Note also that the operating unit 34 may include a microphone and an audio recognition device.

In addition, on the liquid crystal display 35 there are displayed a map image including roads, traffic information, operation guidance, an operation menu, guidance on keys, a guided route from a point of departure to a destination, guidance information according to the guided route, news, a weather forecast, time, an e-mail, a TV program, etc. Note that an HUD or an HMD may be used instead of the liquid crystal display 35.

In addition, the speaker 36 outputs audio guidance that provides guidance on travel along a guided route or guidance on traffic information, based on an instruction from the navigation ECU 33.

In addition, the DVD drive 37 is a drive that can read data recorded on a recording medium such as a DVD or a CD. Then, based on the read data, for example, music or video is played back or the terminal-side map DB 45 is updated. Note that a card slot for performing reading and writing on a memory card may be provided instead of the DVD drive 37.

In addition, the communication module 38 is a communication device for receiving, for example, various information such as map update information, route information, movement guidance information, and traffic information which are transmitted from the server device 3, a VICS (registered trademark) center, a probe center, etc. The communication module 38 corresponds, for example, to a mobile phone or a DCM.

Figure 6:
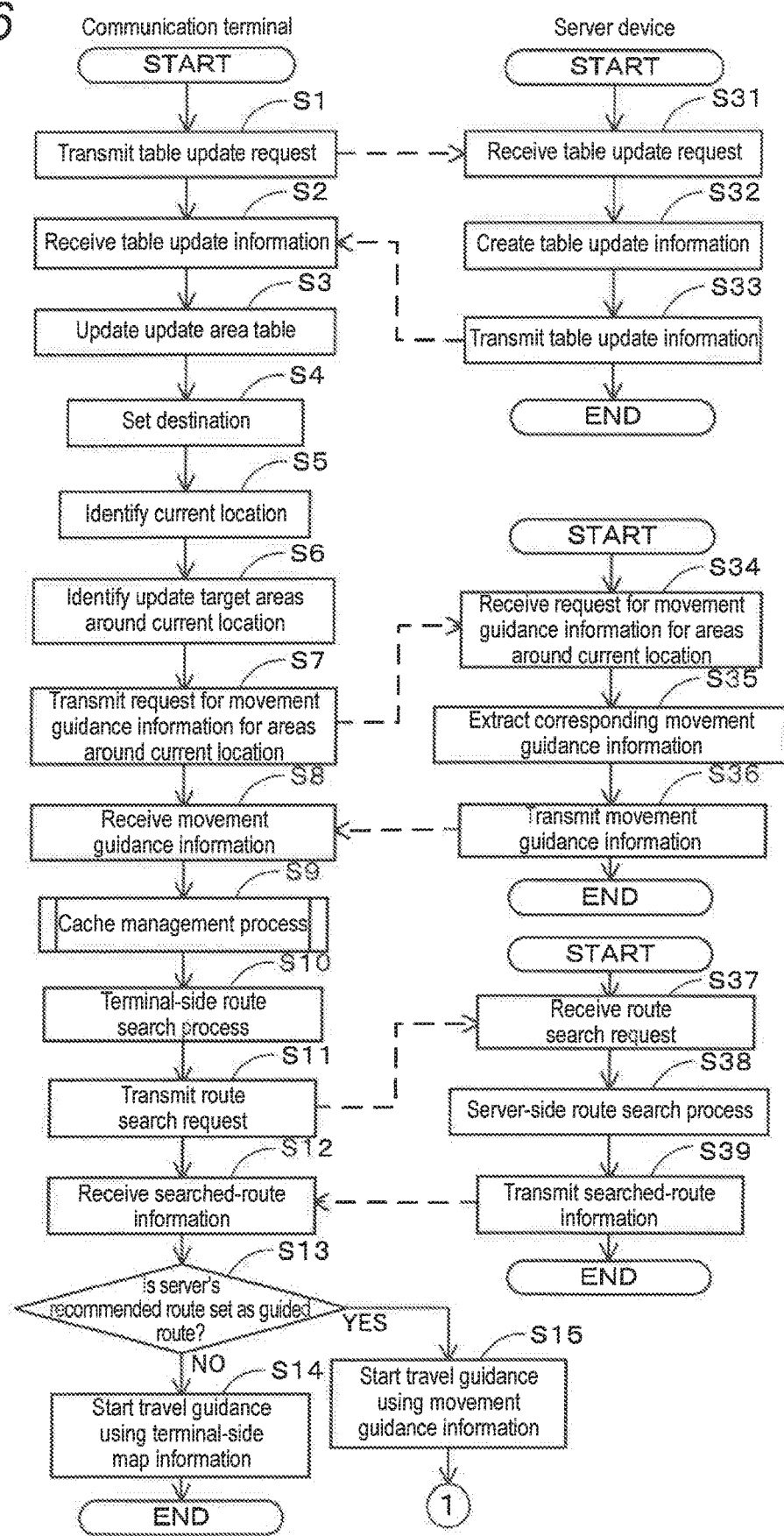
FIG. 6 is a flowchart for a movement guidance processing program according to the first embodiment.
Figure 7:
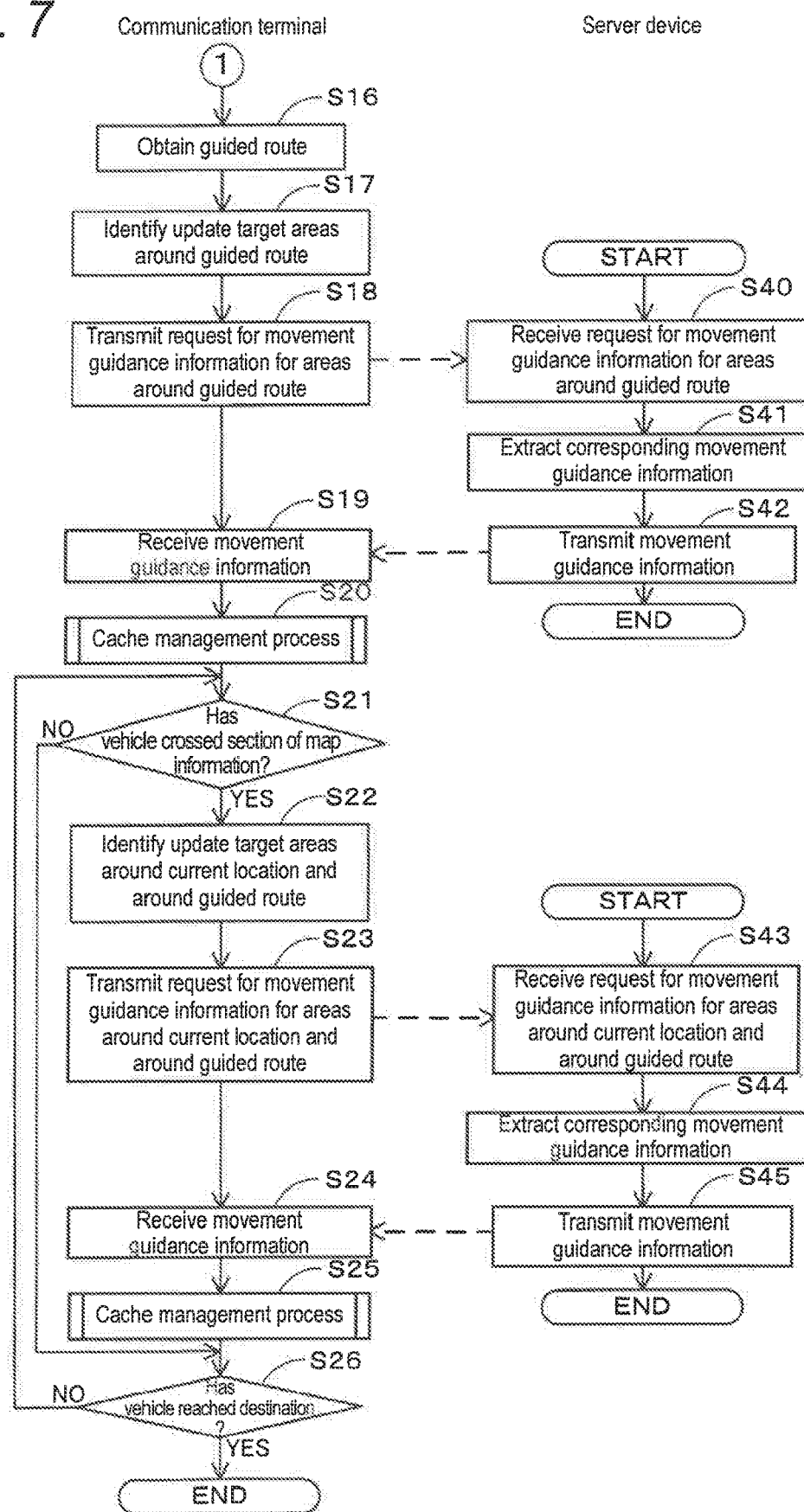
FIG. 7 is a flowchart for the movement guidance processing program according to the first embodiment.
Figure 12:
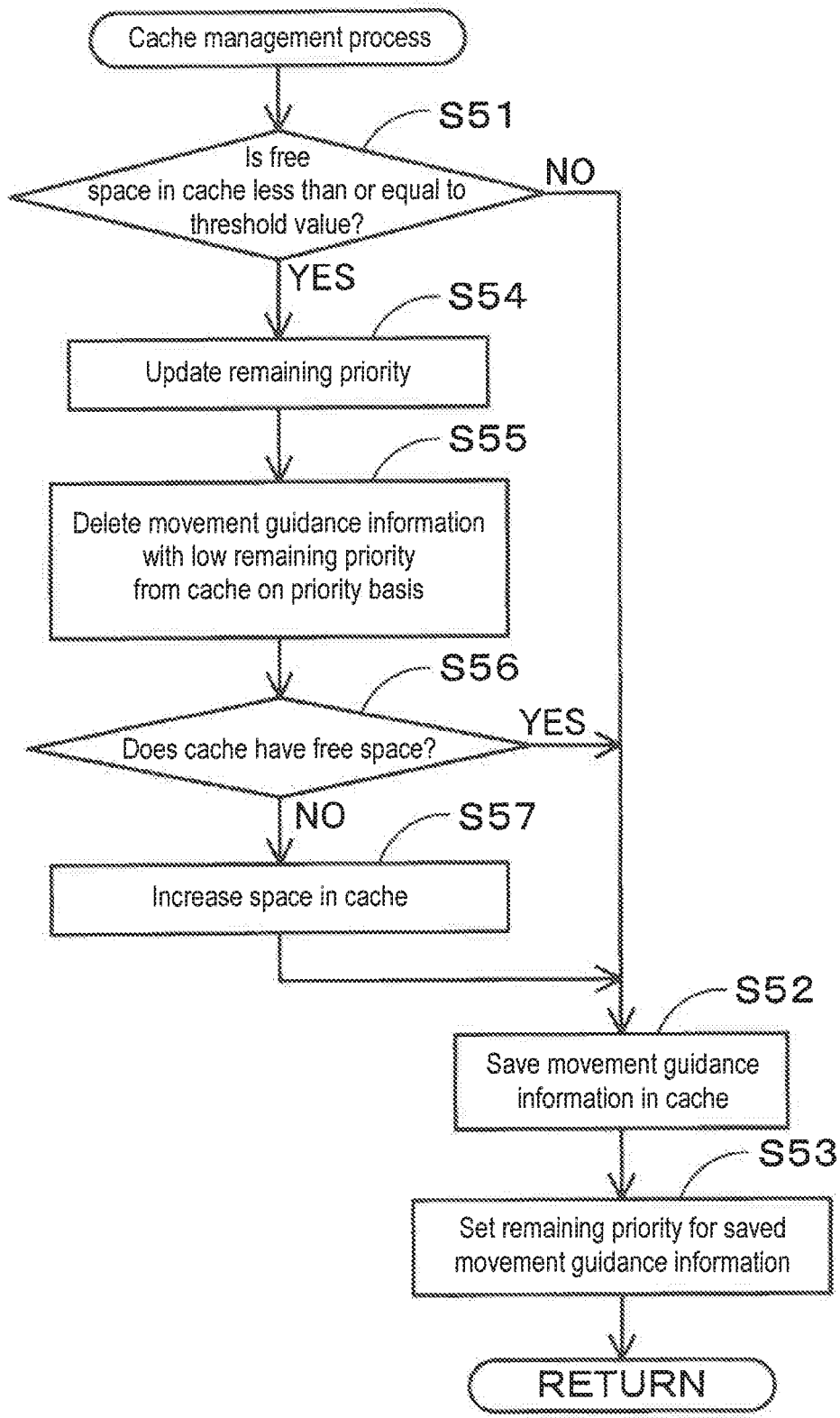
FIG. 12 is a flowchart for a sub-process program for a cache management process.

Next, a movement guidance processing program executed by the server device 3 and the communication terminal 5 in the movement guidance system 1 having the above-described configuration will be described based on FIGS. 6 and 7. FIGS. 6 and 7 are flowcharts for the movement guidance processing program according to the first embodiment. Here, the movement guidance processing program is a program that is executed after a vehicle's accessory (ACC) power supply is turned on and that searches for a route from a point of departure to a destination and provides travel guidance along a guided route. Note, however, that when the communication terminal 5 is other than a navigation device, the program is executed after the power to a main body of the communication terminal 5, instead of the ACC power supply, is turned on (after activation). Note that the following program shown in the flowcharts of FIGS. 6, 7, and 12 is stored in the RAM or ROM included in the server device 3 and the communication terminal 5, and executed by the CPU 21 or the CPU 51.

First, the movement guidance processing program executed by the CPU 51 of the communication terminal 5 will be described based on FIG. 6. At step (hereinafter, abbreviated as S) 1, the CPU 51 transmits a request for update information (hereinafter, referred to as table update information) for updating the update area table 49 included in the communication terminal 5 (hereinafter, referred to as table update request) to the server device 3. As described previously, the update area table 49 is a table in which flags that identify a section corresponding to an update target area and a section not corresponding to an update target area are assigned on a section-by-section basis (e.g., on a mesh-by-mesh basis) of map information (FIG. 4).

In addition, the table update request transmitted at the above-described S1 includes a terminal ID that identifies the communication terminal 5 which is the source of the request for table update information; and information that identifies the version of the terminal-side map information 48 at the present time on a section-by-section basis of map information. Note that for the information that identifies the version of the terminal-side map information 48, specifically, information is transmitted that identifies the creation time of map update information (update program) having made the last update to the terminal-side map information 48 (the creation time also corresponds to the time when current map information is created). Note that a version number or an updated date on which the last update is made may be transmitted. Note also that the information that identifies the version of the terminal-side map information 48 at the present time is stored in the version management DB 46.

Figure 8:
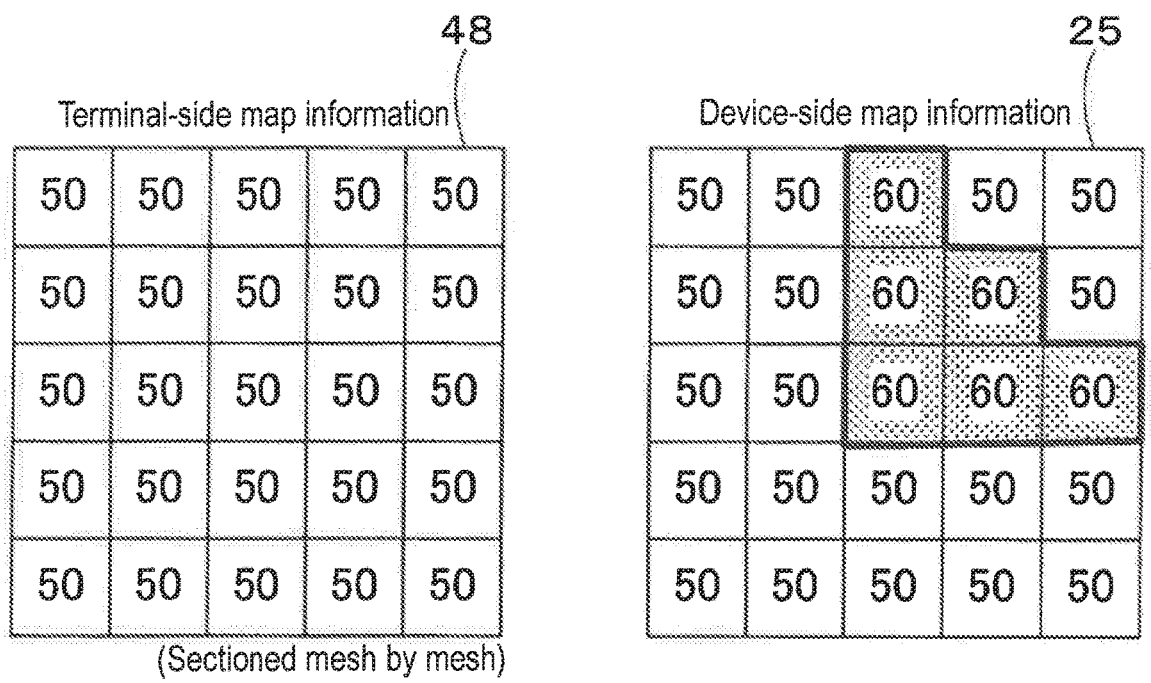
FIG. 8 is a diagram showing an example of table update information.
Figure 8:
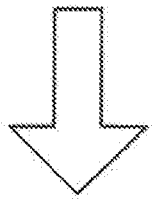

Then, at S2, the CPU 51 receives table update information transmitted from the server device 3 according to the table update request. Here, the table update information received at the above-described S2 is information that is created by the server device 3 by comparing the version of the terminal-side map information 48 at the present time with the version of the device-side map information 25 (S32), and that updates a section whose device-side map information 25 has been updated using map update information which is created after the creation time of map update information (update program) having made the last update to the terminal-side map information 48 (i.e., a section whose device-side map information 25 has a newer creation time than terminal-side map information 48), to an update target area. Note that when the communication terminal 5 transmits a version number together with a table update request to the server device 3, table update information can be created by comparing version numbers, but a possible case in which the version number is downgraded to an old version needs to be considered. FIG. 8 is a diagram showing an example of the table update information.

For example, when, as shown in FIG. 8, the versions of pieces of terminal-side map information 48 included in the communication terminal 5 are all "50," and of the meshes forming the device-side map information 25 included in the server device 3, a total of six meshes have the version "60" that have been updated using map update information created at a time newer than the version "50," table update information is created that updates corresponding six meshes in the update area table 49 to update target areas. As described previously, in the update area table 49, the flag "0" is assigned to a mesh corresponding to an update target area and the flag "1" is assigned to a mesh not corresponding to an update target area (FIG. 4). Therefore, the table update information is data that overwrites the flags assigned to the corresponding six meshes to "0."

Figure 9:
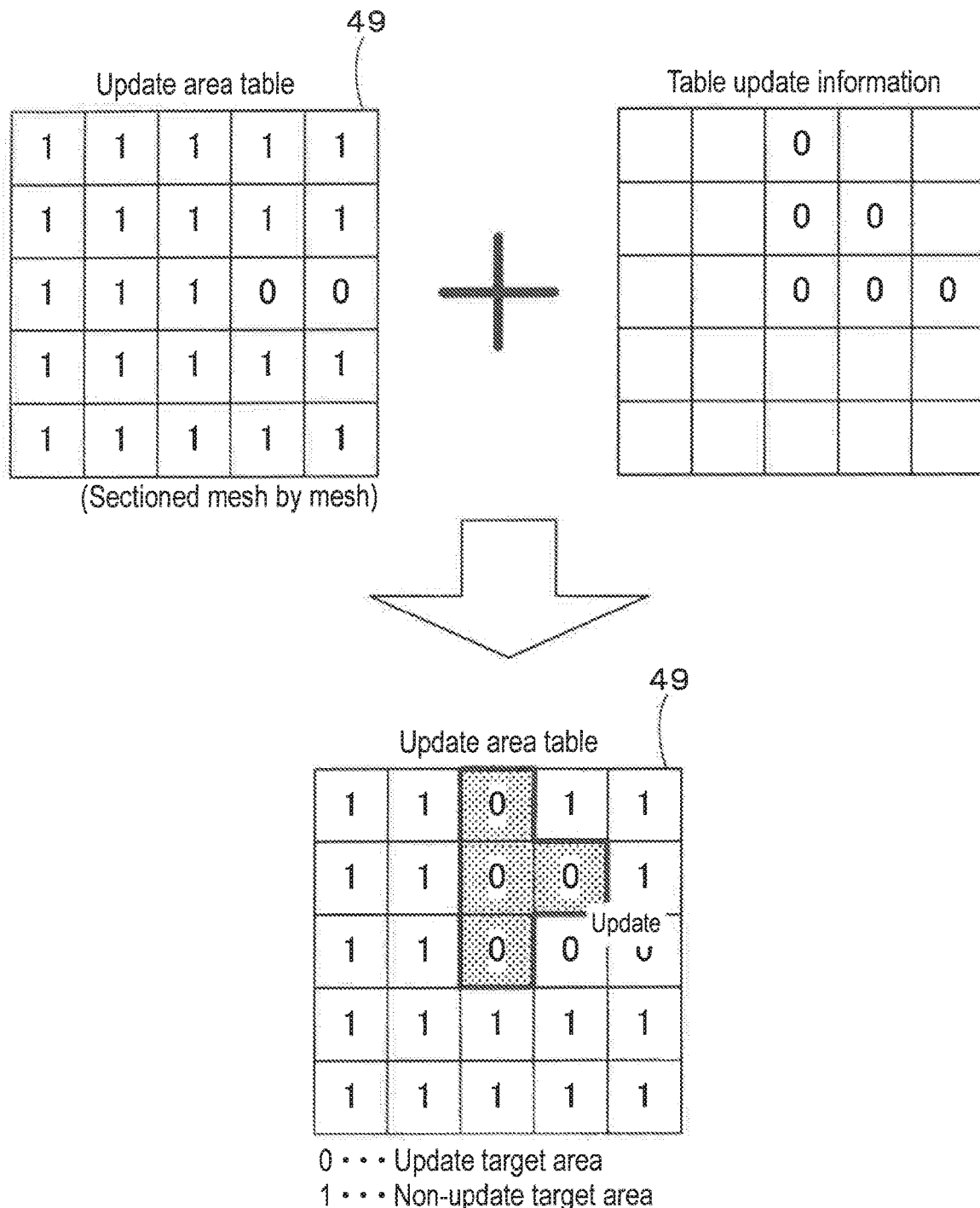
FIG. 9 is a diagram showing an exemplary update to the update area table.

Subsequently, at S3, the CPU 51 updates the update area table 49 based on the table update information received from the server device 3 at the above-described S2. Specifically, as shown in FIG. 9, by combining the update area table 49 with the table update information, of the flags included in the update area table 49, flags assigned to meshes specified by the table update information (in the example shown in FIG. 9, a total of six meshes) are overwritten to "0." Note that of the meshes specified by the table update information, meshes whose flags are already "0" maintain the "0" state.

Then, as a result of updating the update area table 49 at the above-described S3, it becomes possible to accurately reflect areas (i.e., update target areas) whose terminal-side map information 48 included in the communication terminal 5 is an older version of map information relative to device-side map information 25 included in the server device 3 at the present time (after activating the communication terminal 5 and before requesting the server device 3 for movement guidance information), in the update area table 49. Therefore, for example, when device-side map information 25 or terminal-side map information 48 is updated to a new version of map information, the update area table 49 is also updated accordingly.

Then, at S4, the CPU 51 set a destination of a route on the communication terminal 5. Note that the destination is basically set based on a user's operation accepted by the operating unit 34 (e.g., an operation of reading a registered location or an operation of retrieving or selecting a facility). Note, however, that in the case of re-search (rerouting), a destination currently set on the communication terminal 5 is continuously set without newly setting a destination.

Subsequently, at S5, the CPU 51 identifies a current vehicle location based on a detection result obtained by the current location detecting unit 31 and map information. Note that when a current vehicle location is identified, a map matching process for matching the current vehicle location to map information is performed. The current vehicle location is basically identified based on the terminal-side map information 48 included in the communication terminal 5, but in a case in which the version of terminal-side map information 48 for an area in which the vehicle is currently located is older than that of device-side map information 25 (i.e., the case of an update target area), the current vehicle location is identified using movement guidance information 26 stored in the cache 47 instead of an old version of map information or movement guidance information stored in the terminal-side map DB 45. Note, however, that when the cache 47 does not have movement guidance information 26 for the corresponding area, the current vehicle location is identified using an old version of map information or movement guidance information stored in the terminal-side map DB 45.

Figure 10:
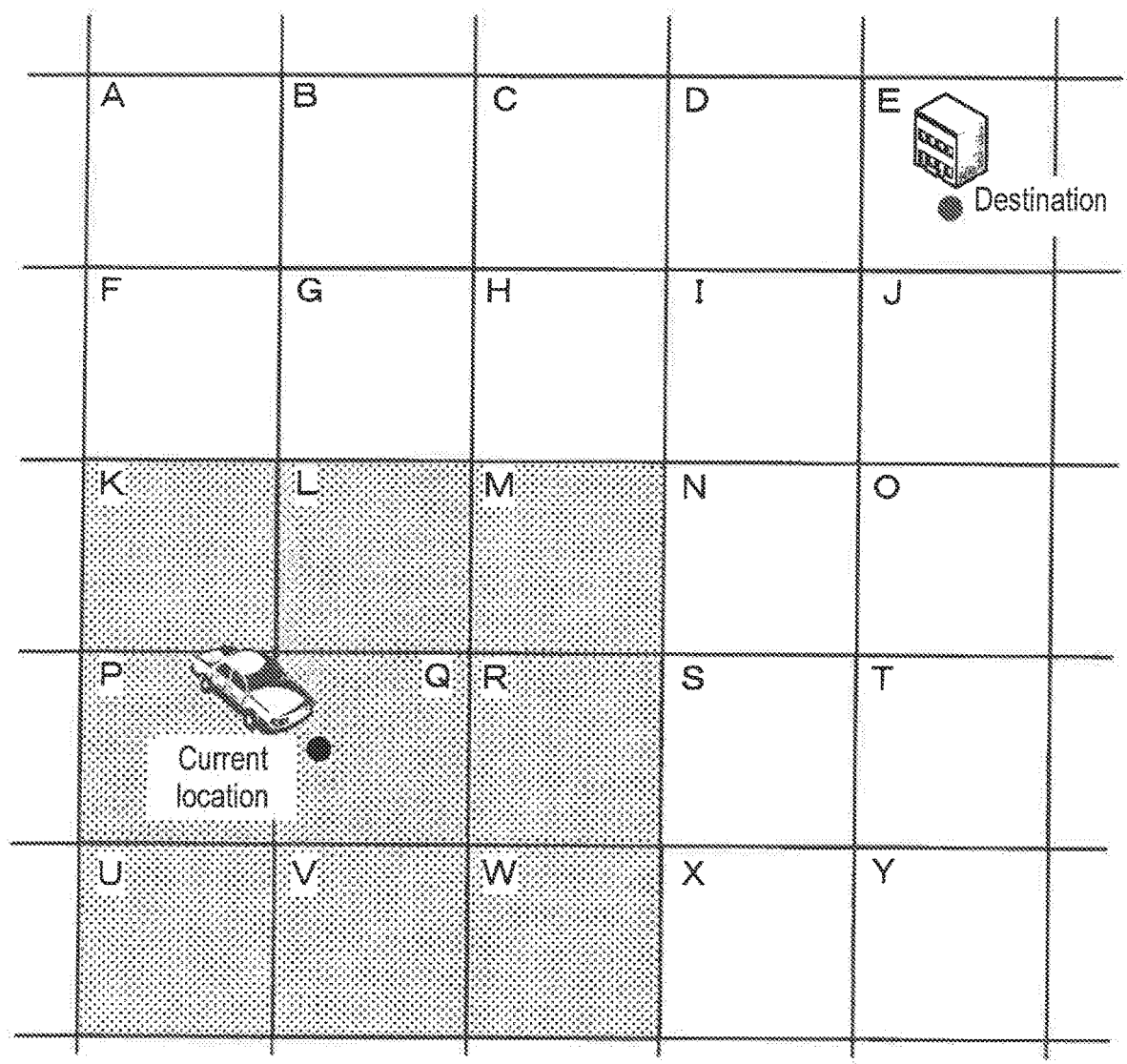
FIG. 10 is a diagram showing areas for which movement guidance information is requested.

Thereafter, at S6, the CPU 51 identifies "update target areas around the current vehicle location," based on the update area table 49 and the current vehicle location identified at the above-described S5. Specifically, the CPU 51 first identifies a total of nine (3×3) meshes with a mesh in which the vehicle is currently located being at the center, as meshes around the current vehicle location. For example, in an example shown in FIG. 10, the mesh in which the vehicle is currently located is a "mesh Q," and thus, the meshes around the current vehicle location are meshes K, L, M, P, Q, R, U, V, and W with the mesh Q being at the center. Thereafter, it is determined, by referring to the update area table 49, whether the meshes K, L, M, P, Q, R, U, V, and W correspond to update target areas, and meshes determined to correspond to update target areas, i.e., meshes assigned the flag "0" in the update area table 49, are identified as "update target areas around the current vehicle location."

Subsequently, at S7, the CPU 51 transmits a request for movement guidance information 26 targeted for the "update target areas around the current vehicle location" identified at the above-described S6, to the server device 3. Note, however, that an area for which identical movement guidance information 26 is already stored in the cache 47 of the communication terminal 5 is excluded from request targets. Here, the movement guidance information 26 is, as described previously, information for identifying a current location, providing simple travel guidance along a guided route, and displaying an image on the communication terminal 5 according to the latest version of map information included in the server device 3. Note that the request for movement guidance information transmitted at the above-described S7 includes a terminal ID that identifies the communication terminal 5 which is the source of the request for movement guidance information; and information (e.g., mesh identification numbers) that identifies target areas for which movement guidance information is requested (the "update target areas around the current vehicle location" identified at the above-described S6).

Thereafter, at S8, the CPU 51 receives movement guidance information 26 transmitted from the server device 3 according to the request for movement guidance information 26. Note that the movement guidance information 26 includes matching data required to perform vehicle map-matching; guidance data required for guidance for allowing the vehicle to travel along a guided route, such as left or right turn guidance at guided intersections; and display data for displaying a map image and a guidance screen. Namely, the movement guidance information 26 received at the above-described S8 is information for identifying a current location, providing simple travel guidance along a guided route, and displaying an image in the update target areas around the current vehicle location.

Note that the process at the above-described S8 is not always performed before the processes at and subsequent to the following S9, and is performed at timing at which movement guidance information 26 is transmitted from the server device 3. Therefore, if the timing at which movement guidance information 26 is transmitted from the server device 3 is late, then the process at S8 may be performed during or after the processes at S9 to S11. Note, however, that in order to prevent the occurrence of an event that movement guidance based on a guided route is not provided or erroneous guidance is provided, it is desirable that the reception of movement guidance information (S8) be performed before the reception of searched-route information (S12). Note that the same also applies to S19 and S24 which will be described later.

In addition, at S9, the CPU 51 performs a cache management process which will be described later (FIG. 12). In the cache management process, as will be described later, the movement guidance information 26 obtained from the server device 3 is saved in the cache 47 of the communication terminal 5, and unnecessary information is deleted from the cache 47.

Then, at S10, the CPU 51 performs a route search process from a point of departure to the destination set at the above-described S4, using the terminal-side map information 48 included in the communication terminal 5, and thereby identifies a recommended route from the point of departure to the destination (hereinafter, referred to as terminal's recommended route). Specifically, a link cost obtained by converting an appropriate level of a link (road) for a route into a number, an intersection cost obtained by converting an appropriate level of an intersection (node) for a route into a number, a charge cost obtained by converting the level of cost required for travel into a number, etc., are calculated based on link data, node data, search data, etc., which are included in the terminal-side map information 48, and a terminal's recommended route is searched for using the calculated search costs. For example, using the publicly known Dijkstra's algorithm, a route with a minimum cost value total is determined to be a terminal's recommended route. Note that a route search process using the Dijkstra's algorithm is already publicly known and thus a detail thereof is omitted. Note also that the point of departure may be the current vehicle location or may be an arbitrary location (e.g., user's home) specified by the user.

Subsequently, at S11, the CPU 51 transmits a route search request for requesting to search for a route from the point of departure to the destination, to the server device 3. Here, the route search request includes a terminal ID that identifies the communication terminal 5 which is the source of the route search request; information that identifies the point of departure (e.g., the current vehicle location) and the destination set at the above-described S4 which are search conditions for a route search; and route information that identifies the terminal's recommended route which is searched for at the above-described S10. Note, however, that when performing rerouting due to the vehicle deviating from a guided route, since the destination is basically the same as that set at the last search, information that identifies the destination does not need to be transmitted.

In addition, for the route information that identifies the terminal's recommended route, information that identifies the entire terminal's recommended route may be transmitted, but only information that identifies particularly a road array of the terminal's recommended route that continues ahead from the point of departure within a predetermined distance from the point of departure may be transmitted.

Thereafter, at S12, the CPU 51 receives searched-route information transmitted from the server device 3 according to the route search request. Here, the searched-route information received at the above-described S12 is information about a recommended route from the point of departure to the destination (hereinafter, referred to as server's recommended route) that is searched for by the server device 3 based on the route search request transmitted at the above-described S11 and using the device-side map information 25 which is the latest version of map information.

Subsequently, at S13, the CPU 51 determines whether to set the server's recommended route received at the above-described S12 as a guided route for the communication terminal 5. Note that when a server's recommended route is received from the server device 3, the received server's recommended route is basically set as a guided route for the communication terminal 5. Note, however, that when, for example, a server's recommended route has not been able to be received from the server device 3 due to a communication error, etc., a route other than a server's recommended route, such as the terminal's recommended route searched for by the communication terminal 5 at the above-described S10, is set as a guided route for the communication terminal 5.

Then, if it is determined to set a route other than the server's recommended route as a guided route for the communication terminal 5 (S13: NO), processing transitions to S14.

At S14, the CPU 51 sets, for example, the terminal's recommended route searched for in the route search process at the above-described S10, as a guided route to provide vehicle travel guidance on the communication terminal 5. Thereafter, vehicle travel guidance starts based on the set guided route. For example, a map image including a road network around the vehicle location is displayed, or when a guided divergence point at which a left or right turn is to be made approaches a predetermined distance ahead of the vehicle, an enlarged view of the guided divergence point is displayed or a vehicle traveling direction at the guided divergence point is guided. In addition, at the above-described S14, the CPU 51 basically provides the above-described travel guidance, based on the terminal-side map information 48 and the movement guidance information 26 that are stored in the terminal-side map DB 45. Here, since the terminal's recommended route searched for in the route search process at the above-described S10 is a route searched for based on the terminal-side map information 48 included in the communication terminal 5, even if an old version of movement guidance information 26 is used instead of a new version of movement guidance information 26 obtained from the server device 3, guidance can be provided with a correct current vehicle location being identified, and thus, it becomes possible to guide a correct vehicle traveling direction at a guided intersection. Note, however, that for areas having new versions of pieces of movement guidance information 26 obtained from the server device 3, the above-described travel guidance may be provided using those pieces of movement guidance information 26.

On the other hand, if it is determined to set the server's recommended route received at the above-described S12, as a guided route for the communication terminal 5 (S13: YES), processing transitions to S15.

At S15, the CPU 51 sets the server's recommended route received at the above-described S12, as a guided route to provide vehicle travel guidance on the communication terminal 5. Thereafter, vehicle travel guidance starts based on the set guided route. For example, a map image including a road network around the vehicle location is displayed, or when a guided divergence point at which a left or right turn is to be made approaches a predetermined distance ahead of the vehicle, an enlarged view of the guided divergence point is displayed or a vehicle traveling direction at the guided divergence point is guided. In addition, at the above-described S15, the CPU 51 basically provides the above-described travel guidance, based on the terminal-side map information 48 and the movement guidance information 26 that are stored in the terminal-side map DB 45. Note, however, that when the terminal-side map information 48 and the movement guidance information 26 that are stored in the terminal-side map DB 45 are not the latest version for areas around the current vehicle location or areas around the guided route, the above-described travel guidance is provided using also the movement guidance information 26 that is obtained from the server device 3 and stored in the cache 47. Note that since the movement guidance information 26 includes matching data required to perform vehicle map-matching; guidance data required for guidance for allowing the vehicle to travel along a guided route, such as left or right turn guidance at guided intersections; and display data for displaying a map image and a guidance screen, even if the terminal-side map information 48 and the movement guidance information 26 that are stored in the terminal-side map DB 45 are not the latest version, travel guidance along a guided route that is searched for based on the latest version of map information can be appropriately provided.

Subsequently, at S16, the CPU 51 obtains the guided route set on the communication terminal 5 at the present time.

Figure 11:
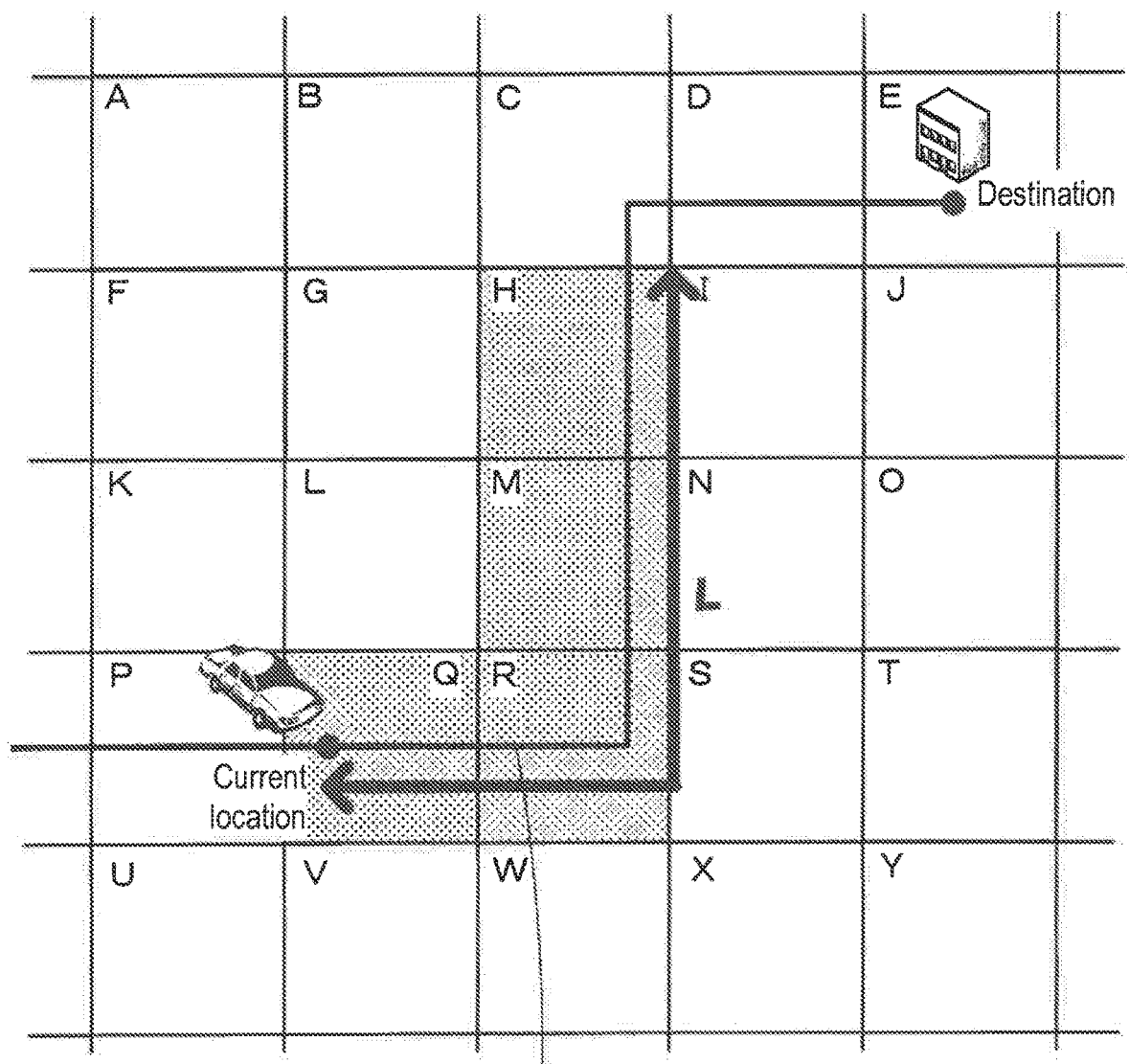
FIG. 11 is a diagram showing areas for which movement guidance information is requested.

Then, at S17, the CPU 51 identifies "update target areas around the guided route," based on the update area table 49 and the guided route obtained at the above-described S16. Specifically, the CPU 51 first identifies meshes including at least a part of the guided route within a predetermined distance L from the current vehicle location in the direction of the destination, as meshes around the guided route. For example, in an example shown in FIG. 11, the meshes including at least a part of a guided route 61 within a predetermined distance L from a current vehicle location in the direction of a destination are meshes H, M, Q, and R. Thereafter, it is determined, by referring to the update area table 49, whether the meshes H, M, R, and Q correspond to update target areas, and meshes determined to correspond to update target areas, i.e., meshes assigned the flag "0" in the update area table 49, are identified as "update target areas around the guided route."

Subsequently, at S18, the CPU 51 transmits a request for movement guidance information 26 targeted for the "update target areas around the guided route" identified at the above-described S6, to the server device 3. Note, however, that an area for which identical movement guidance information 26 is already stored in the cache 47 of the communication terminal 5 is excluded from request targets. Note that the request for movement guidance information transmitted at the above-described S18 includes a terminal ID that identifies the communication terminal 5 which is the source of the request for movement guidance information; and information (e.g., mesh identification numbers) that identifies target areas for which movement guidance information is requested (the "update target areas around the guided route" identified at the above-described S17).

Thereafter, at S19, the CPU 51 receives movement guidance information 26 transmitted from the server device 3 according to the request for movement guidance information 26. Note that the movement guidance information 26 includes matching data required to perform vehicle map-matching; guidance data required for guidance for allowing the vehicle to travel along a guided route, such as left or right turn guidance at guided intersections; and display data for displaying a map image and a guidance screen. Namely, the movement guidance information 26 received at the above-described S19 is information for identifying a current location, providing simple travel guidance along a guided route, and displaying an image in the update target areas around the guided route.

In addition, at S20, the CPU 51 performs a cache management process which will be described later (FIG. 12). In the cache management process, as will be described later, the movement guidance information 26 obtained from the server device 3 is saved in the cache 47 of the communication terminal 5, and unnecessary information is deleted from the cache 47.

Subsequently, at S21, the CPU 51 determines whether the vehicle has crossed a section (e.g., a mesh) of map information.

Then, if it is determined that the vehicle has crossed a section of map information (S21: YES), processing transitions to S22. On the other hand, if it is determined that the vehicle has not crossed a section of map information (S21: NO), processing transitions to S26.

At S22, the CPU 51 identifies "update target areas around the current vehicle location" and "update target areas around the guided route," based on the update area table 49, the current vehicle location, and the guided route obtained at the above-described S16. Note that the identification of the "update target areas around the current vehicle location" is the same process as that at S6 and the identification of the "update target areas around the guided route" is the same process as that at S17, and thus, a detail thereof is omitted.

Subsequently, at S23, the CPU 51 transmits a request for movement guidance information 26 targeted for the "update target areas around the current vehicle location" and the "update target areas around the guided route" which are identified at the above-described S22, to the server device 3. Note, however, that an area for which identical movement guidance information 26 is already stored in the cache 47 of the communication terminal 5 is excluded from request targets. Note that the request for movement guidance information transmitted at the above-described S23 includes a terminal ID that identifies the communication terminal 5 which is the source of the request for movement guidance information; and information (e.g., mesh identification numbers) that identifies target areas for which movement guidance information is requested (the "update target areas around the current vehicle location" and the "update target areas around the guided route" which are identified at the above-described S21).

Thereafter, at S24, the CPU 51 receives movement guidance information 26 transmitted from the server device 3 according to the request for movement guidance information 26. Note that the movement guidance information 26 includes matching data required to perform vehicle map-matching; guidance data required for guidance for allowing the vehicle to travel along a guided route, such as left or right turn guidance at guided intersections; and display data for displaying a map image and a guidance screen. Namely, the movement guidance information 26 received at the above-described S24 is information for identifying a current location, providing simple travel guidance along a guided route, and displaying an image in the update target areas around the current vehicle location and the update target areas around the guided route.

In addition, at S25, the CPU 51 performs a cache management process which will be described later (FIG. 12). In the cache management process, as will be described later, the movement guidance information 26 obtained from the server device 3 is saved in the cache 47 of the communication terminal 5, and unnecessary information is deleted from the cache 47. Thereafter, processing transitions to S26.

At S26, the CPU 51 determines whether the vehicle has reached the destination.

Then, if it is determined that the vehicle has reached the destination (S26: YES), the movement guidance processing program ends. On the other hand, if it is determined that the vehicle has not reached the destination (S26: NO), processing returns to S21 and the reception of movement guidance information and travel guidance using the received movement guidance information are continuously performed.

Next, the movement guidance processing program executed by the CPU 21 of the server device 3 will be described. Note that the processes at the following S31 to S33, S34 to S36, S37 to S39, S40 to S42, and S43 to S45 each start at timing at which corresponding information from the communication terminal 5 is received, and are performed in parallel to each other. Therefore, the steps are not always performed in ascending order of their step numbers. For example, when a route search request is received from the communication terminal 5 before the completion of a process at S35 which will be described later, S37 and S38 are performed before S36.

First, at S31, the CPU 21 receives a table update request transmitted from the communication terminal 5 after the activation of the communication terminal 5. Note that the table update request includes a terminal ID that identifies the communication terminal 5 which is the source of the table update request; and information that identifies the version of the terminal-side map information 48 at the present time on a section-by-section basis of map information. When the table update request is received from the communication terminal 5, processes at the following S32 and S33 are performed.

At S32, the CPU 21 creates table update information for updating the update area table 49 included in the communication terminal 5, based on the table update request received at the above-described S31. Specifically, the version of the terminal-side map information 48 at the present time received at the above-described S31 is compared with the version of the device-side map information 25 included in the server device 3, to identify a section (e.g., a mesh) whose device-side map information 25 has been updated using map update information which is created after the creation time of map update information (update program) having made the last update to the terminal-side map information 48. Then, table update information is created that updates flags for the identified sections to "0 (update target area)" among the flags included in the update area table 49 (FIG. 8).

Thereafter, at S33, the CPU 21 transmits the table update information created at the above-described S32 to the requested communication terminal 5. Then, the communication terminal 5 having received the table update information updates the update area table 49 based on the received table update information (S3).

In addition, at S34, the CPU 21 receives a request for movement guidance information 26 which is transmitted from the communication terminal 5 after updating the update area table 49. Note that the request for movement guidance information 26 includes a terminal ID that identifies the communication terminal 5 which is the source of the request for movement guidance information; and information (e.g., mesh numbers) that identifies target areas for which movement guidance information is requested (the update target areas around the current vehicle location which are identified at the above-described S6). When the request for movement guidance information 26 is received from the communication terminal 5, processes at the following S35 and S36 are performed.

At S35, the CPU 21 extracts movement guidance information 26 for the corresponding areas from the device-side map DB 12, based on the request for movement guidance information 26 received at the above-described S34.

Thereafter, at S36, the CPU 21 transmits the movement guidance information 26 extracted at the above-described S35 to the requested communication terminal 5.

In addition, at S37, the CPU 21 receives a route search request transmitted from the communication terminal 5. Note that the route search request includes a terminal ID that identifies the communication terminal 5 which is the source of the route search request; information that identifies a point of departure (e.g., a current vehicle location) and a destination set at the above-described S4 which are search conditions for a route search; and route information that identifies a terminal's recommended route which is searched for at the above-described S10. When the route search request is received from the communication terminal 5, processes at the following S38 and S39 are performed.

Then, at S38, the CPU 21 performs a route search process from the point of departure to the destination using the route search request received at the above-described S37 and the device-side map information 25 included in the server device 3, and thereby identifies a recommended route from the point of departure to the destination (server's recommended route). Note that the server's recommended route is a route including at least a part of the terminal's recommended route which is searched for by the communication terminal 5. More specifically, a route to the destination that is connected to a portion of the terminal's recommended route within a predetermined distance from the point of departure is searched for, and a route obtained by combining the portion of the terminal's recommended route within the predetermined distance from the point of departure with the searched route is determined to be a server's recommended route.

Subsequently, at S39, the CPU 21 transmits searched-route information that identifies the server's recommended route identified at the above-described S38, to the communication terminal 5 which is the source of the route search request. As a result, the server's recommended route is set as a guided route on the communication terminal 5. Note that in order to prevent the occurrence of an event that movement guidance based on a guided route is not provided or erroneous guidance is provided, it is desirable that the transmission of movement guidance information (S36) be performed before the transmission of searched-route information (S39).

In addition, at S40, the CPU 21 receives a request for movement guidance information 26 which is transmitted from the communication terminal 5 after setting the guided route. Note that the request for movement guidance information 26 includes a terminal ID that identifies the communication terminal 5 which is the source of the request for movement guidance information; and information (e.g., mesh numbers) that identifies target areas for which movement guidance information is requested (the update target areas around the guided route which are identified at the above-described S17). When the request for movement guidance information 26 is received from the communication terminal 5 after setting the guided route, processes at the following S41 and S42 are performed.

Subsequently, at S41, the CPU 21 extracts movement guidance information 26 for the corresponding areas from the device-side map DB 12, based on the request for movement guidance information 26 received at the above-described S40.

Thereafter, at S42, the CPU 21 transmits the movement guidance information 26 extracted at the above-described S41 to the requested communication terminal 5.

In addition, at S43, the CPU 21 receives a request for movement guidance information 26 which is transmitted from the communication terminal 5 after crossing a section of map information. Note that the request for movement guidance information 26 includes a terminal ID that identifies the communication terminal 5 which is the source of the request for movement guidance information; and information (e.g., mesh numbers) that identifies target areas for which movement guidance information is requested (the update target areas around the current vehicle location and around the guided route which are identified at the above-described S22). When the request for movement guidance information 26 is received from the communication terminal 5 after crossing a section of map information, processes at the following S44 and S45 are performed.

Subsequently, at S44, the CPU 21 extracts movement guidance information 26 for the corresponding areas from the device-side map DB 12, based on the request for movement guidance information 26 received at the above-described S43.

Thereafter, at S45, the CPU 21 transmits the movement guidance information 26 extracted at the above-described S44 to the requested communication terminal 5.

Next, a sub-process of the cache management process performed at the above-described S9, S20, and S25 will be described based on FIG. 12. FIG. 12 is a flowchart for a sub-process program for the cache management process.

First, at S51, the CPU 51 determines whether the amount of free space in the cache 47 is less than or equal to a threshold value. Note that the threshold value is the maximum size of movement guidance information 26 that is possibly obtained from the server device 3 at a time.

Then, if it is determined that the amount of free space in the cache 47 is less than or equal to the threshold value (S51: YES), processing transitions to S54. On the other hand, if it is determined that the amount of free space in the cache 47 is larger than the threshold value (S51: NO), processing transitions to S52.

At S52, the CPU 51 stores movement guidance information 26 received from the server device 3 in the cache 47. Note that the movement guidance information 26 stored in the cache 47 is used later to identify a current location, provide simple travel guidance along a guided route, and display an image on the communication terminal 5.

Then, at S53, the CPU 51 sets remaining priorities for the movement guidance information 26 that is newly stored in the cache 47 at the above-described S52, on a per area section basis. Note that the remaining priorities are information for sorting movement guidance information 26 to be deleted when the cache 47 is lack of its storage area. Specifically, of the pieces of movement guidance information 26 stored in the cache 47, those with a low remaining priority are deleted on a priority basis.

Specifically, at the above-described S53, the CPU 51 identifies area sections that require movement guidance information 26 for the future vehicle movement guidance, more specifically, each of "area sections located around the current vehicle location" and "area sections located around the guided route set on the communication terminal 5." Then, movement guidance information 26 for the identified area sections is set with a higher remaining priority than movement guidance information 26 for other area sections. Here, the movement guidance information 26 that is newly stored in the cache 47 at the above-described S52 is movement guidance information 26 for area sections located around the current vehicle location or area sections located around the guided route set on the communication terminal 5. Therefore, at the above-described S53, the remaining priorities are basically set to "A (high)." Note that for area sections that are determined to require movement guidance information 26 for the future vehicle movement guidance, a high remaining priority may also be likewise set for movement guidance information 26 for area sections other than the area sections located around the current vehicle location or the area sections located around the guided route.

On the other hand, at S54, the CPU 51 updates the remaining priorities set for the respective pieces of movement guidance information 26 stored in the cache 47, on a per area section basis. Here, as shown in FIG. 5, the movement guidance information 26 stored in the cache 47 is set with remaining priorities on a section-by-section basis (e.g., on a mesh-by-mesh basis) of map information. At the above-described S54, the CPU 51 updates the remaining priorities according to the following conditions (1) and (2):

(1) Movement guidance information 26 for area sections located around the current vehicle location (e.g., 3×3 meshes with the current vehicle location being at the center) or area sections located around the guided route set on the communication terminal 5 (e.g., meshes including the guided route) is highly likely to be required for the future vehicle movement guidance and thus the remaining priority is set to "A (high)." On the other hand, movement guidance information 26 for other area sections is less likely to be required in the future and thus the remaining priority is set to "B (low)."

(2) Note, however, that irrespective of the above-described (1), for movement guidance information 26 for area sections whose terminal-side map information 48 is the latest version, i.e., area sections for which the communication terminal 5 can provide travel guidance based on the latest version of map information without using movement guidance information 26, the remaining priority is set to "B (low)."

Thereafter, at S55, the CPU 51 deletes movement guidance information 26 with a low remaining priority among the movement guidance information 26 stored in the cache 47, on a priority basis. Specifically, movement guidance information 26 whose remaining priority is set to "B (low)" is deleted from the cache on a per area section (mesh) basis.

Thereafter, at S56, the CPU 51 determines again whether the amount of free space in the cache 47 is less than or equal to the threshold value.

Then, if it is determined that the amount of free space in the cache 47 is less than or equal to the threshold value (S56: YES), processing transitions to S57. On the other hand, if the amount of free space in the cache 47 is larger than the threshold value (S56: NO), processing transitions to S52.

At S57, the CPU 51 temporarily increases storage space allocated to the cache 47 in the hard disk or memory. Note that the space is increased to such an amount that the amount of free space after the increase in the cache 47 is larger than the threshold value which serves as a criterion of determination at the above-described S51. In addition, the configuration may be such that the increased space in the cache is put back later at timing at which the free space in the cache 47 has increased, or is not put back. Thereafter, processing transitions to S52.

As described in detail above, in the movement guidance system 1, the server device 3, the communication terminal 5, and the computer program executed by the server device 3 and the communication terminal 5 according to the first embodiment, when the communication terminal 5 has set a destination (S4), update target areas which are areas whose terminal-side map information 48 included in the communication terminal 5 is an older version of map information relative to device-side map information 25 included in the server device 3 are identified (S6, S17, and S22); a request for movement guidance information 26 targeted for at least update target areas around a current location is made to the server device 3, the movement guidance information 26 being for providing movement guidance for a mobile unit (S7, S18, and S23); and movement guidance for the mobile unit is provided using movement guidance information 26 transmitted from the server device 3 according to the request (S15). Thus, when performing a center route search, by obtaining in advance movement guidance information 26 for providing movement guidance for the mobile unit, the occurrence of an event that after the communication terminal 5 obtains a guided route from the server device 3, movement guidance based on the guided route is not provided or erroneous guidance is provided can be prevented as much as possible. As a result, even if map information included in the communication terminal 5 is an older version of map information compared to map information included in the server device 3, movement guidance for the mobile unit based on a guided route that is searched for by the server device 3 can be appropriately provided.

In addition, in the first embodiment, vehicle movement guidance is provided by obtaining in advance movement guidance information 26 for providing vehicle movement guidance from the server device 3, instead of map information (including facility data, data used for a route search, etc., in addition to movement guidance information 26 for providing vehicle movement guidance) (S15). Here, since the movement guidance information 26 has a smaller amount of data than the map information, the amount of information delivered can be reduced compared to the case of obtaining a new version of map information to provide vehicle movement guidance (or the case of obtaining update information for updating map information to a new version).

Second Embodiment

Figure 13:
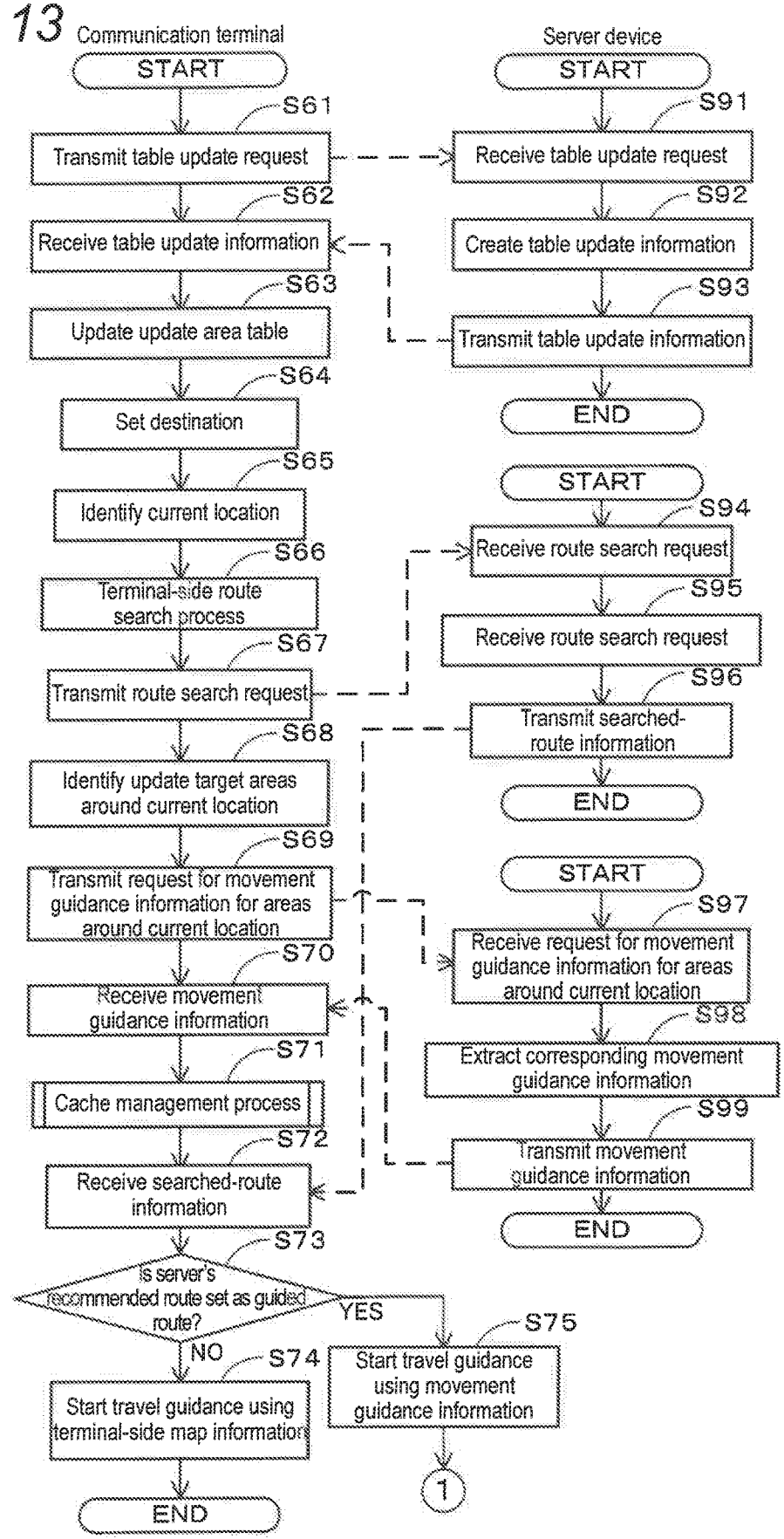
FIG. 13 is a flowchart for a movement guidance processing program according to a second embodiment.
Figure 14:
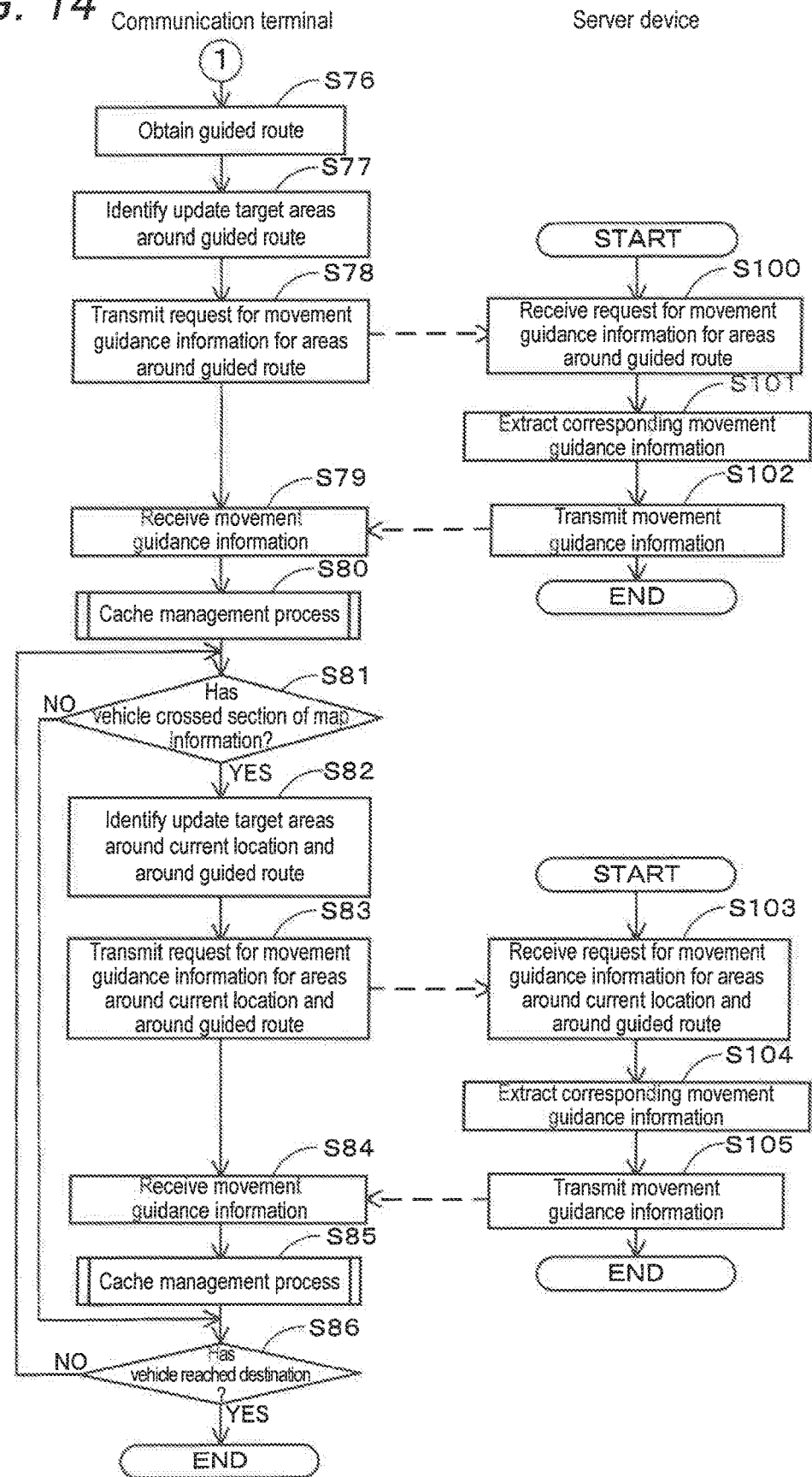
FIG. 14 is a flowchart for the movement guidance processing program according to the second embodiment.

Next, a movement guidance system according to a second embodiment will be described based on FIGS. 13 and 14. Note that in the following description the same reference signs as those of the configuration of the movement guidance system 1 according to the first embodiment in the above-described FIGS. 1 to 12 indicate the same or corresponding portions as/to the configuration of the movement guidance system 1, etc., according to the first embodiment.

A schematic configuration of a movement guidance system 1 according to the second embodiment is substantially the same as that of the movement guidance system 1 according to the first embodiment. In addition, various control processes are also substantially the same as those of the movement guidance system 1 according to the first embodiment.

Note, however, that the movement guidance system 1 according to the second embodiment differs from the movement guidance system 1 according to the first embodiment in that, while in the movement guidance system 1 of the first embodiment, movement guidance information is requested to the server device 3 on the condition that a destination is set on the communication terminal 5, in the movement guidance system 1 according to the second embodiment, movement guidance information is requested to the server device 3 on the condition that a route search request is transmitted from the communication terminal 5 to the server device 3.

Next, a movement guidance processing program executed by the server device 3 and the communication terminal 5 in the movement guidance system 1 according to the second embodiment will be described based on FIGS. 13 and 14. FIGS. 13 and 14 are flowcharts for the movement guidance processing program according to the second embodiment.

First, the movement guidance processing program executed by the CPU 51 of the communication terminal 5 will be described based on FIG. 13. Note that S61 to S65 are the same processes as those at S1 to S5 of the movement guidance processing program according to the first embodiment (FIG. 6) and thus description thereof is omitted.

Then, at S66, the CPU 51 performs a route search process from a point of departure to a destination set at the above-described S64, using the terminal-side map information 48 included in the communication terminal 5, and thereby identifies a recommended route from the point of departure to the destination (terminal's recommended route). The detail is the same as that of S10 and thus is omitted.

Subsequently, at S67, the CPU 51 transmits a route search request for requesting to search for a route from the point of departure to the destination, to the server device 3. Here, the route search request includes a terminal ID that identifies the communication terminal 5 which is the source of the route search request; information that identifies the point of departure (e.g., a current vehicle location) and the destination set at the above-described S64 which are search conditions for a route search; and route information that identifies the terminal's recommended route which is searched for at the above-described S66. Note, however, that when performing rerouting due to the vehicle deviating from a guided route, since the destination is basically the same as that set at the last search, information that identifies the destination does not need to be transmitted.

Thereafter, at S68, the CPU 51 identifies "update target areas around the current vehicle location," based on the update area table 49 and the current vehicle location identified at the above-described S65. The detail is the same as that of S6 and thus is omitted.

Subsequently, at S69, the CPU 51 transmits a request for movement guidance information 26 targeted for the "update target areas around the current vehicle location" identified at the above-described S68, to the server device 3. Note, however, that an area for which identical movement guidance information 26 is already stored in the cache 47 of the communication terminal 5 is excluded from request targets. Here, the movement guidance information 26 is, as described previously, information for identifying a current location, providing simple travel guidance along a guided route, and displaying an image on the communication terminals 5 according to the latest version of map information included in the server device 3. Note that the request for movement guidance information transmitted at the above-described S69 includes a terminal ID that identifies the communication terminal 5 which is the source of the request for movement guidance information; and information (e.g., mesh identification numbers) that identifies target areas for which movement guidance information is requested (the "update target areas around the current vehicle location" identified at the above-described S68).

Thereafter, at S70, the CPU 51 receives movement guidance information 26 transmitted from the server device 3 according to the request for movement guidance information 26. Note that the movement guidance information 26 includes matching data required to perform vehicle map-matching; guidance data required for guidance for allowing the vehicle to travel along a guided route, such as left or right turn guidance at guided intersections; and display data for displaying a map image and a guidance screen. Namely, the movement guidance information 26 received at the above-described S70 is information for identifying a current location, providing simple travel guidance along a guided route, and displaying an image in the update target areas around the current vehicle location.

Note that the process at the above-described S70 is not always performed before the processes at and subsequent to the following S71, and is performed at timing at which movement guidance information 26 is transmitted from the server device 3. Therefore, if the timing at which movement guidance information 26 is transmitted from the server device 3 is late, then the process at S70 may be performed during or after the process at S71. Note, however, that in order to prevent the occurrence of an event that movement guidance based on a guided route is not provided or erroneous guidance is provided, it is desirable that the transmission of movement guidance information (S70) be performed before the reception of searched-route information (S72). Note that the same also applies to S79 and S84 which will be described later.

In addition, at S71, the CPU 51 performs a cache management process of FIG. 12 (FIG. 12). In the cache management process, as described previously, the movement guidance information 26 obtained from the server device 3 is saved in the cache 47 of the communication terminal 5, and unnecessary information is deleted from the cache 47.

Thereafter, at S72, the CPU 51 receives searched-route information transmitted from the server device 3 according to the route search request. Here, the searched-route information received at the above-described S72 is information about a recommended route from the point of departure to the destination (server's recommended route) that is searched for by the server device 3 based on the route search request transmitted at the above-described S67 and using the device-side map information 25 which is the latest version of map information.

S73 to S86 performed thereafter are the same processes as those at S13 to S26 of the movement guidance processing program according to the first embodiment (FIGS. 6 and 7) and thus description thereof is omitted.

In addition, the movement guidance processing program executed by the CPU 21 of the server device 3 also has the same processes as the movement guidance processing program according to the first embodiment (FIGS. 6 and 7) and thus description thereof is omitted. Note that the processes at S91 to S93, S94 to S96, S97 to S99, S100 to S102, and S103 to S105 each start at timing at which corresponding information from the communication terminal 5 is received, and are performed in parallel to each other. Therefore, the steps are not always performed in ascending order of their step numbers. Note, however, that in order to prevent the occurrence of an event that movement guidance based on a guided route is not provided or erroneous guidance is provided, it is desirable that the transmission of movement guidance information (S99) be performed before the transmission of searched-route information (S96).

As described in detail above, in the movement guidance system 1, the server device 3, the communication terminal 5, and the computer program executed by the server device 3 and the communication terminal 5 according to the second embodiment, when the communication terminal 5 requests the server device 3 for a route search (S67), update target areas which are areas whose terminal-side map information 48 included in the communication terminal 5 is an older version of map information relative to device-side map information 25 included in the server device 3 are identified (S68); movement guidance information 26 targeted for at least update target areas around a current location is requested to the server device 3, the movement guidance information 26 being for providing movement guidance for a mobile unit (S69); and movement guidance for the mobile unit is provided using movement guidance information 26 transmitted from the server device 3 according to the request (S75). Thus, when performing a center route search, by obtaining in advance movement guidance information 26 for providing movement guidance for the mobile unit, the occurrence of an event that after the communication terminal 5 obtains a guided route from the server device 3, movement guidance based on the guided route is not provided or erroneous guidance is provided can be prevented as much as possible. As a result, even if map information included in the communication terminal 5 is an older version of map information compared to map information included in the server device 3, movement guidance for the mobile unit based on a guided route that is searched for by the server device 3 can be appropriately provided.

Note that the above-described embodiments need not be limiting and it is, of course, possible to make various modifications and alterations thereto without departing from the spirit and scope of the broad inventive principles.

For example, although in the first and second embodiments the configuration is such that the communication terminal 5 performs processes for identifying update target areas around a current vehicle location and around a guided route at the above-described S6, S17, S22, S68, S77, and S82, the configuration may be such that the server device 3 performs the processes. In that case, the server device 3 needs to have or obtain from the communication terminal 5 an update area table 49, a current vehicle location, and a guided route set on the communication terminal 5.

In addition, although in the first and second embodiments the configuration is such that the communication terminal 5 requests the server device 3 for movement guidance information 26 targeted for update target areas around a current vehicle location and update target areas around a guided route, the communication terminal 5 may also request the server device 3 for movement guidance information 26 targeted for update target areas in an area where a map image is displayed on the liquid crystal display 35. As a result, for example, when a map image displayed on the liquid crystal display 35 is scroll displayed, it becomes possible to display a map image based on the latest version of map information.

In addition, although in the first and second embodiments the configuration is such that remaining priorities set for movement guidance information 26 are updated immediately before deleting movement guidance information from the cache 47 (S54), the remaining priorities may be updated at timing, e.g., at predetermined time intervals, upon the activation of the communication terminal 5, or at a time point when the vehicle has crossed a mesh.

In addition, although in the first and second embodiments, when the communication terminal 5 requests the server device 3 for movement guidance information 26, identical movement guidance information 26 that is already stored in the cache 47 of the communication terminal 5 is excluded from request targets, the movement guidance information 26 may be included in request targets.

In addition, although in the first and second embodiments, when the communication terminal 5 requests the server device 3 for movement guidance information for update target areas around a guided route, meshes including at least a part of a guided route within a predetermined distance L from a current vehicle location in the direction of a destination serve as targets, irrespective of the distance from the current vehicle location, meshes including at least a part of the guided route may serve as targets.

In addition, although in the first and second embodiments the update area table 49 is a table in which a mesh corresponding to an update target area and a mesh not corresponding to an update target area are identified on a mesh-by-mesh basis of map information (FIG. 4), the identification may be performed, for example, on a per administrative district basis such as a city, a ward, a town, or a village, instead of on a mesh-by-mesh basis.

In addition, although in the first and second embodiments the movement guidance information 26 is information divided on a mesh-by-mesh basis of map information (FIG. 5), the movement guidance information 26 may be information divided, for example, on a per administrative district basis such as a city, a ward, a town, or a village, instead of on a mesh-by-mesh basis. In addition, when remaining priorities are set for the movement guidance information 26, too, the setting may be likewise performed on a per administrative district basis instead of on a mesh-by-mesh basis.

In addition, although in the first embodiment the communication terminal 5 requests the server device 3 for movement guidance information 26 for areas around a current location (S7) at timing that is after setting a destination (S4) and before transmitting a route search request to the server device 3 (S11), the request for movement guidance information may be made at any other timing as long as it is after activating the communication terminal 5 and before setting a guided route.

In addition, although implementation examples are described above in which a communication terminal, a server device, a movement guidance system, and a computer program are embodied, the communication terminal can also have the following configurations and in that case the following advantageous effects are provided.

For example, a first configuration is as follows:

A communication terminal (5) that is connected to a server device (3) in a two-way communicable manner and that transmits a route search request for a destination to the server device and obtains a route searched for and delivered by the server device according to the route search request includes: guidance information requesting means (33) for, when setting a destination or transmitting the route search request to the server device, d requesting the server device for guidance information (26) targeted for at least an update target area around a current location among update target areas, the guidance information being for providing movement guidance for a mobile unit, and the update target areas being areas whose terminal-side map information (48) included in the communication terminal is an older version of map information relative to device-side map information (25) included in the server device; guidance information receiving means (33) for receiving the guidance information transmitted from the server device according to the request for the guidance information; and guiding means (33) for providing the movement guidance for the mobile unit using a guided route set on the communication terminal and the guidance information received by the guidance information receiving means.

According to the communication terminal having the above-described configuration, when performing a center route search, by obtaining in advance guidance information for providing movement guidance for the mobile unit, the occurrence of an event that after the communication terminal obtains a guided route from the server device, movement guidance based on the guided route is not provided or erroneous guidance is provided can be prevented as much as possible. As a result, even if map information included in the communication terminal is an older version of map information compared to map information included in the server device, movement guidance for the mobile unit based on a guided route that is searched for by the server device can be appropriately provided.

In addition, a second configuration is as follows:

The update target areas are identified based on area identification information (49) that identifies a section corresponding to the update target area and a section not corresponding to the update target area on a section-by-section basis of map information.

According to the communication terminal having the above-described configuration, a section corresponding to the update target area and a section not corresponding to the update target area can be easily and promptly identified without the need of a complex control process or communication process.

In addition, a third configuration is as follows:

The update target areas are identified on a mesh-by-mesh basis.

According to the communication terminal having the above-described configuration, by identifying update target areas on a mesh-by-mesh basis, the mesh being the same as a management section of map information, processes for identifying update target areas and requesting guidance information according to the identification of update target areas can be more easily performed.

In addition, a fourth configuration is as follows:

The guidance information requesting means (33) requests the server device (3) for guidance information (26) targeted for update target areas around the current location and around the guided route.

According to the communication terminal having the above-described configuration, it becomes possible to obtain from the server device guidance information targeted for areas in which the mobile unit is likely to move in the future, i.e., areas that require guidance information. Thus, even if map information included in the communication terminal is an older version of map information compared to map information included in the server device, movement guidance for the mobile unit can be appropriately provided by using guidance information.

The invention claimed is:

1. A communication terminal that is connected to a server device in a two-way communicable manner and that transmits a route search request for a destination to the server device and obtains a route searched for and delivered by the server device according to the route search request, the communication terminal comprising:
a processor programmed to:
request, when setting a destination or transmitting the route search request to the server device, the server device for guidance information targeted for at least an update target area around a current location among update target areas, the guidance information being for providing movement guidance for a mobile unit, and the update target areas being areas whose terminal-side map information included in the communication terminal is an older version of map information relative to device-side map information included in the server device;
receive the guidance information transmitted from the server device according to the request for the guidance information; and
provide the movement guidance for the mobile unit, the movement guidance using a two-part guided route including:
a first part based on the received guidance information transmitted from the server device for the update target area around a current location; and
a second part based on a guided route set on the communication terminal without reference to the received guidance information transmitted from the server.

2. The communication terminal according to claim 1, wherein the update target areas are identified based on area identification information that identifies a section corresponding to the update target area and a section not corresponding to the update target area on a section-by-section basis of map information.

3. The communication terminal according to claim 1, wherein the update target areas are identified on a mesh-by-mesh basis.

4. The communication terminal according to claim 1, wherein the processor is programmed to request the server device for guidance information targeted for update target areas around the current location and around the guided route.

5. A computer-readable storage medium storing a computer-executable program causing a communication terminal that is connected to a server device in a two-way communicable manner and that transmits a route search request for a destination to the server device and obtains a route searched for and delivered by the server device according to the route search request, to perform functions comprising:

requesting, when setting a destination or transmitting the route search request to the server device, the server device for guidance information targeted for at least an update target area around a current location among update target areas, the guidance information being for providing movement guidance for a mobile unit, and the update target areas being areas whose terminal-side map information included in the communication terminal is an older version of map information relative to device-side map information included in the server device;

receiving the guidance information transmitted from the server device according to the request for the guidance information; and providing the movement guidance for the mobile unit, the movement guidance using a two-part guided route including:

a first part based on the received guidance information transmitted from the server device for the update target area around a current location; and a second part based on a guided route set on the communication terminal without reference to the received guidance information transmitted from the server.

6. A server device that is connected to a communication terminal in a two-way communicable manner and that receives a route search request for a destination from the communication terminal and delivers a route searched for according to the received route search request to the communication terminal, the server device comprising:

a processor programmed to:

receive a request for guidance information for providing movement guidance for a mobile unit from the communication terminal that sets a destination or transmits the route search request to the server device; and transmit guidance information targeted for at least an update target area around a current location of the mobile unit among update target areas to the communication terminal according to a request for the guidance information, the update target areas being areas whose terminal-side map information included in the communication terminal is an older version of map information relative to device-side map information included in the server device, the transmitted guidance information for the update target area around the current location to constitute only a first part of two-part movement guidance from the current location to the destination that is being provided by the communication terminal.

7. A movement guidance system comprising:

a communication terminal that is connected to a server device in a two-way communicable manner and that transmits a route search request for a destination to the server device and obtains a route searched for and delivered by the server device according to the route search request, the communication terminal comprising a first processor programmed to:

request, when setting a destination or transmitting the route search request to the server device, the server device for guidance information targeted for at least an update target area around a current location among update target areas, the guidance information being for providing movement guidance for a mobile unit, and the update target areas being areas whose terminal-side map information included in the communication terminal is an older version of map information relative to device-side map information included in the server device;

receive the guidance information transmitted from the server device according to the request for the guidance information; and provide the movement guidance for the mobile unit, the movement guidance using a two-part guided route including:

a first part based on the received guidance information transmitted from the server device for the update target area around a current location; and a second part based on a guided route set on the communication terminal without reference to the received guidance information transmitted from the server; and the server device comprising a second processor programmed to:

receive the request for the guidance information from the communication terminal; and transmit the guidance information for the targeted area to the communication terminal according to the request for the guidance information.

\* \* \* \* \*